United States Patent
Borel-Donohue

(10) Patent No.: US 12,101,693 B2
(45) Date of Patent: *Sep. 24, 2024

(54) LOCALIZATION BY USING SKYLINE DATA

(71) Applicants: U.S. Gov't as Represented by Sec of Army c/o U.S Army DEVCOM Army Research Laboratory, Adelphi, MD (US); U.S. Gov, as represented by the Sec of Army c/o U.S. Army DEVCOM Army Research Laboratory, Adelphi, MD (US)

(72) Inventor: Christoph C. Borel-Donohue, Silver Spring, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/202,086

(22) Filed: May 25, 2023

(65) Prior Publication Data

US 2023/0370815 A1    Nov. 16, 2023

Related U.S. Application Data

(63) Continuation of application No. 16/916,025, filed on Jun. 29, 2020, now Pat. No. 11,678,140.

(51) Int. Cl.
*H04W 4/029* (2018.01)
*G01C 21/36* (2006.01)
(Continued)

(52) U.S. Cl.
CPC ........ *H04W 4/029* (2018.02); *G01C 21/3602* (2013.01); *G06T 7/75* (2017.01);
(Continued)

(58) Field of Classification Search
CPC ..... H04W 4/029; G01C 21/3602; G01C 1/00; G06T 7/75; G06T 15/60;
(Continued)

(56) References Cited

U.S. PATENT DOCUMENTS 8,249,302 B2    8/2012    Ramalingam et al.
8,311,285 B2    11/2012   Ramalingam et al.
(Continued)

FOREIGN PATENT DOCUMENTS

CA    2723875 C    11/2018

OTHER PUBLICATIONS

Ratti, C., et al., "Raster analysis of urban form," Environment and Planning B: Planning and Design 2004, vol. 31, Apr. 1, 2004, pp. 297-309.

(Continued)

*Primary Examiner* — Christopher M Brandt
(74) *Attorney, Agent, or Firm* — Eric B. Compton

(57) ABSTRACT

Methods, systems, and computer code on computer-readable media are provided that are directed to generating area skyline data using a digital elevation or surface models (DEMs or DESs) and shadow casting techniques. Some embodiments use an area of maximum shadow line overlap, for shadow line images based on target location skyline azimuth and elevation angle data, as the best approximation for the position of the target location in an area. Some embodiments select the location showing the best fit to the target skyline azimuth and elevation angle data as the best approximation for the target location.

13 Claims, 24 Drawing Sheets

(51) Int. Cl.
    *G06T 7/73*        (2017.01)
    *G06T 15/60*      (2006.01)
    *G06V 20/00*     (2022.01)

(52) U.S. Cl.
    CPC .............. *G06T 15/60* (2013.01); *G06V 20/39* (2022.01); *G06T 2207/30244* (2013.01); *G06T 2215/12* (2013.01)

(58) Field of Classification Search
    CPC ....... G06T 2207/30244; G06T 2215/12; G06T 17/05; G06T 2207/30184; G06V 20/39; G06V 20/17; G06V 20/176; G01S 5/16
    See application file for complete search history.

(56) References Cited

U.S. PATENT DOCUMENTS

| | | | |
|---|---|---|---|
| 8,442,305 B2 | 5/2013 | Ramalingam | |
| 11,678,140 B2 | 7/2023 | Borel-Donohue | |
| 2011/0150320 A1* | 6/2011 | Ramalingam | H04N 7/18 382/154 |
| 2015/0219437 A1* | 8/2015 | Dowski | G05D 1/0278 701/1 |
| 2019/0026400 A1* | 1/2019 | Fuscoe | G06F 30/13 |

OTHER PUBLICATIONS

Meguro, J., et al., "Development of Positioning Technique using Omni directional IR Camera and Aerial Survey Data," 2007 IEEE/ ASME International Conference on Advanced Intelligent Mechatronics, Zurich, Switzerland, Sep. 4-7, 2007, Conference Paper, 6 pages.
Ramalingam, S., et al., "Geolocalization using Skylines from Omni-Images," 2009 IEEE 12th International Conference on Computer Vision Workshops, ICCV Workshops, Kyoto, Japan, Sep. 27-Oct. 4, 2009, pp. 23-30.
David, P., et al., "Registering Ground and Satellite Imagery for Visual Localization," Army Research Laboratory Technical Report, ARL-TR-6105, Aug. 2012, pp. 1-20.
Zamir, A., et al., "Large-Scale Visual Geo-Localization," Springer, Chapter 6: Singh, G., et al., "Semantically Guided Geo-location and Modeling in Urban Environments," Jul. 6, 2016, pp. 101-120.
Zamir, A., et al., "Large-Scale Visual Geo-Localization," Springer, Chapter 11: Saurer, O., et al., "Image-Based Large-Scale Geo-localization in Mountainous Regions," Jul. 6, 2016, pp. 205-223.
Zamir, A., et al., "Large-Scale Visual Geo-Localization," Springer, Chapter 12: Zhu, J., et al., "Adaptive Rendering for Large-Scale Skyline Characterization and Matching," Jul. 6, 2016, pp. 225-237.
Zamir, A., et al., "Large-Scale Visual Geo-Localization," Springer, Chapter 13: Tzeng, E., et al., "User-Aided Geo-location of Untagged Desert Imagery," Jul. 6, 2016, pp. 239-254.
Zamir, A., et al., "Large-Scale Visual Geo-Localization," Springer, Chapter 16: Gupta, H., et al., "A Real-World System for Image/ Video Geo-localization," Jul. 6, 2016, pp. 299-320.
Chellappa, R., "Frontiers in Image and Video Analysis NSF/FBI/ DARPA Workshop Report," National Science Foundation Grant, University of Maryland Institute for Advanced Computer Studies, http://users.umiacs.umd.edu/~rama/NSF_report.pdf, Jan. 10, 2014, pp. 1-120.

* cited by examiner

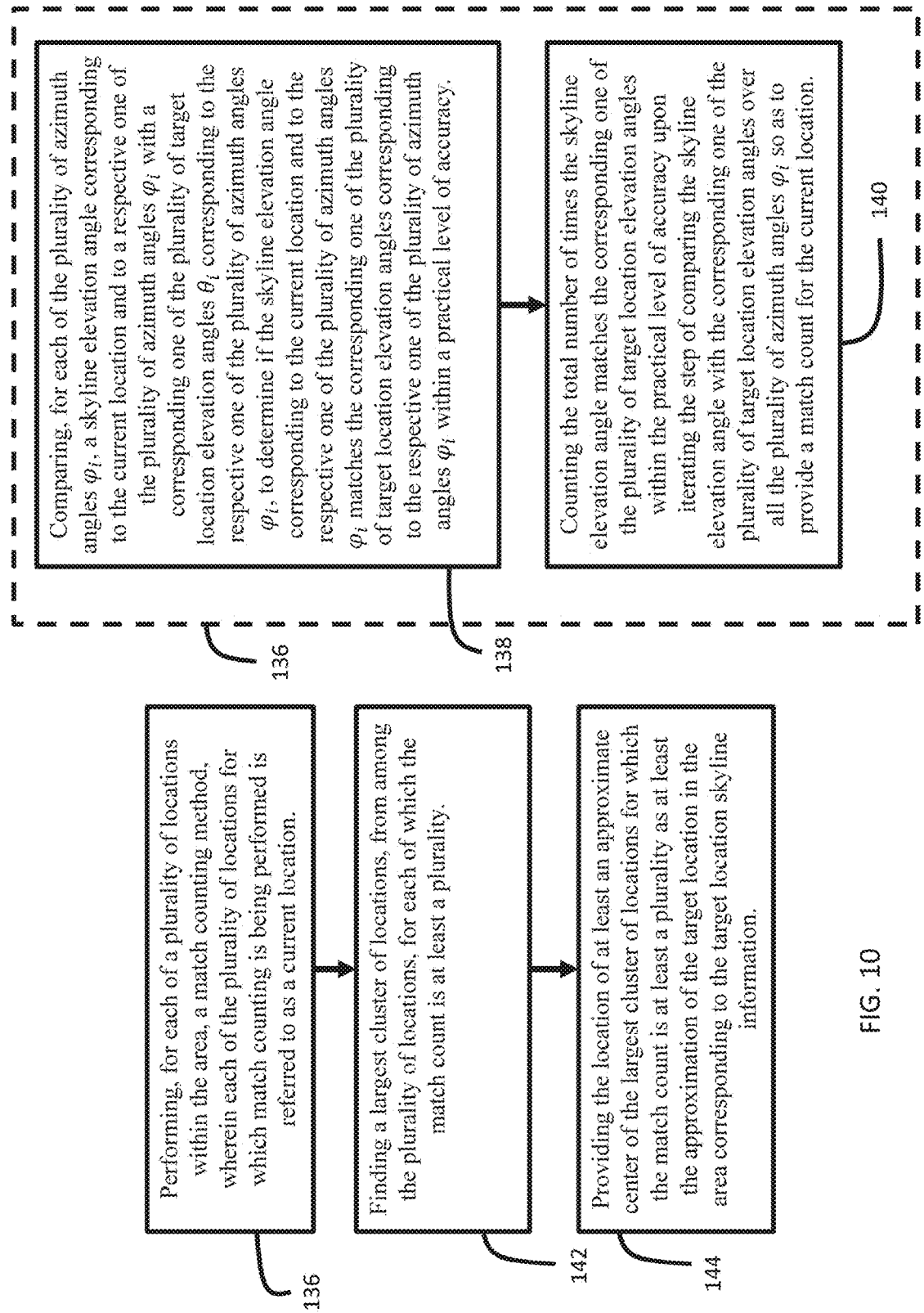

US 12,101,693 B2

LOCALIZATION BY USING SKYLINE DATA

RELATED APPLICATION DATA

This application is a continuation of U.S. patent application Ser. No. 16/916,025 filed on Jun. 29, 2020, the disclosure of which is herein incorporated by reference in its entirety for all purposes.

GOVERNMENT INTEREST

The embodiments herein may be manufactured, used, and/or licensed by or for the United States Government without the payment of royalties thereon.

BACKGROUND

Technical Field

The embodiments herein generally relate to systems, methods, or software products on machine readable media for determining the geographic location of a person, object, or place by matching measured and computed skyline data.

Description of the Related Art

The global positioning system (GPS) is in common use for localization, locating the map or grid coordinates of persons, vehicles, and sites. Unfortunately, GPS has certain drawbacks. GPS often is severely degraded in urban environments because of buildings blocking GPS signals or creating wrong locations because of reflections from building sides.

Visual location or positioning systems have been proposed that use ray tracing or 3D CAD (computer aided design) graphics. However, these systems are computationally intensive and are beyond the capabilities of most mobile devices. Accordingly, there is a need for effective, efficient, and less computationally intensive visual location or positioning systems.

SUMMARY

The embodiments disclosed herein are methods, systems, and computer-readable media that are directed to determining an observer location within an area using a computer system that employs shadow casting techniques. The embodiments disclosed herein provide systems and methods to visually locate and track a person or vehicle in a complex urban terrain composed of tall buildings and trees. An initial localization of a person or vehicle that has no prior knowledge of its position can be made in the cloud by uploading N angles describing the skyline of an observer. The initial and following localizations are performed by matching the measured to the computed skylines derived from a digital elevation model (DEM, e.g. LIDAR data). If the DEM is available in the field then the localization can also occur using computations on a mobile device.

The embodiments disclosed herein allow the computation of the location of an observer with a minimum of equipment, such as a compass and an inclinometer, to record the skyline defined by nearby structures such as buildings or trees and the ability to transmit the measured data to a remote facility, which matches, using the methods of the embodiments herein, the measured skyline data to computed skylines from a digital elevation model. Localization independent from a remote facility can be performed on a portable low-compute power device which is capable of capturing a panoramic view of the skyline using the methods of the embodiments herein.

In view of the foregoing, the embodiments disclosed herein include methods, systems, and programs stored on computer-readable media that are directed to determining an observer location within an area using a computer system that employs digital elevation or surface models (DEMs or DESs) and shadow casting techniques.

Some of the embodiments disclosed herein are directed to determining an observer location within an area using a computer system by using an area of maximum shadow line overlap, for shadow line images based on skyline azimuth and elevation angle data reported by the observer, as the best approximation for the observer's location.

Some of the embodiments disclosed herein are directed to determining an observer location within an area using a computer system by generating skyline azimuth and elevation angle data for multiple locations in an area and selecting the location showing the best fit to skyline azimuth and elevation angle data reported by the observer as the best approximation for the observer's location.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 10 is a flow diagram illustrating a process for determining a target location in an area by matching target location skyline elevation angles with area skyline elevation angles according to some embodiments herein;

FIG. 11 is a flow diagram illustrating a process for counting matches between target location skyline elevation angles and area skyline elevation angles according to some embodiments herein;

DETAILED DESCRIPTION

Figure 1:
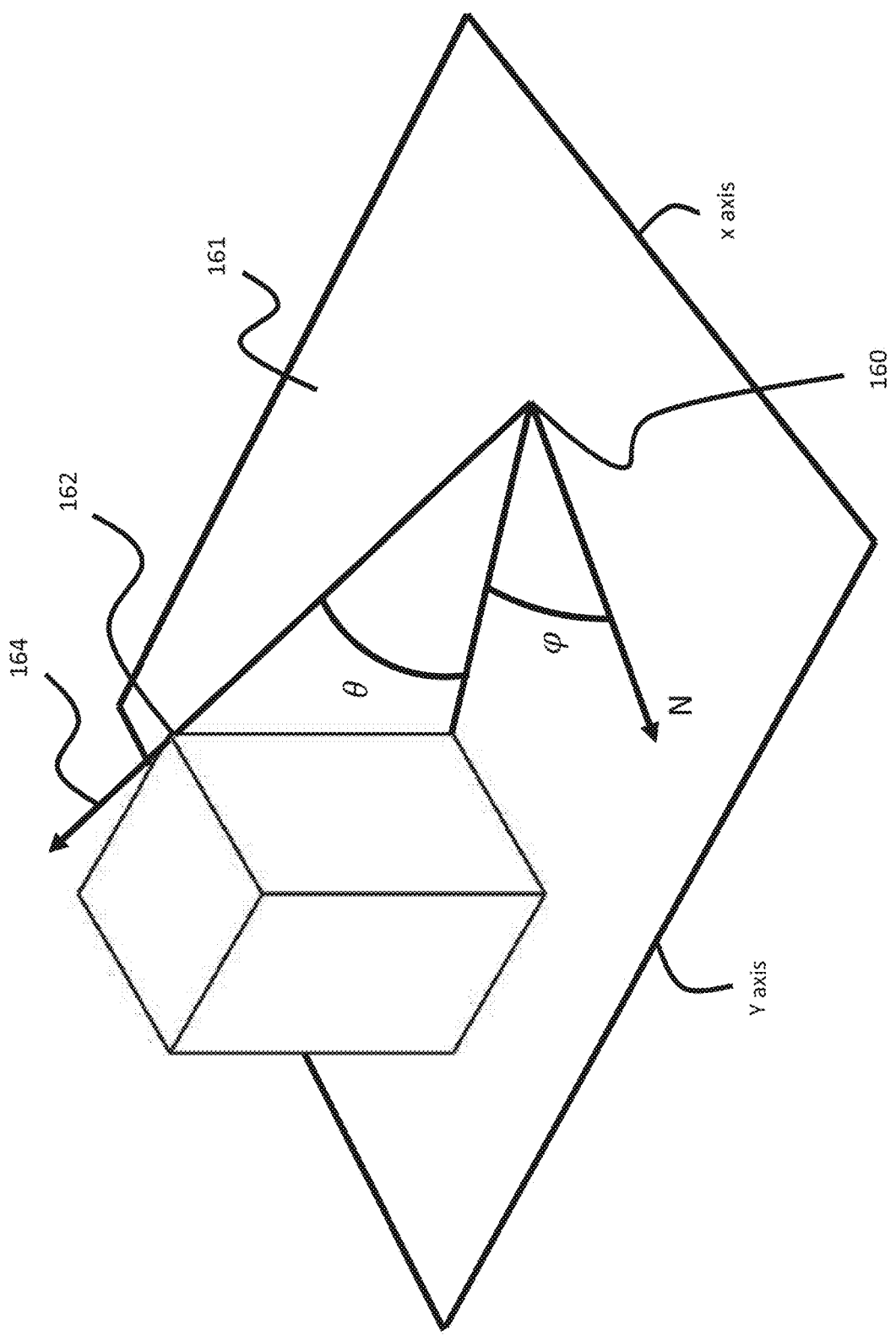
FIG. 1 is a schematic diagram illustrating a azimuth and elevation angle pair for a location in an urban environment.
Figure 2:
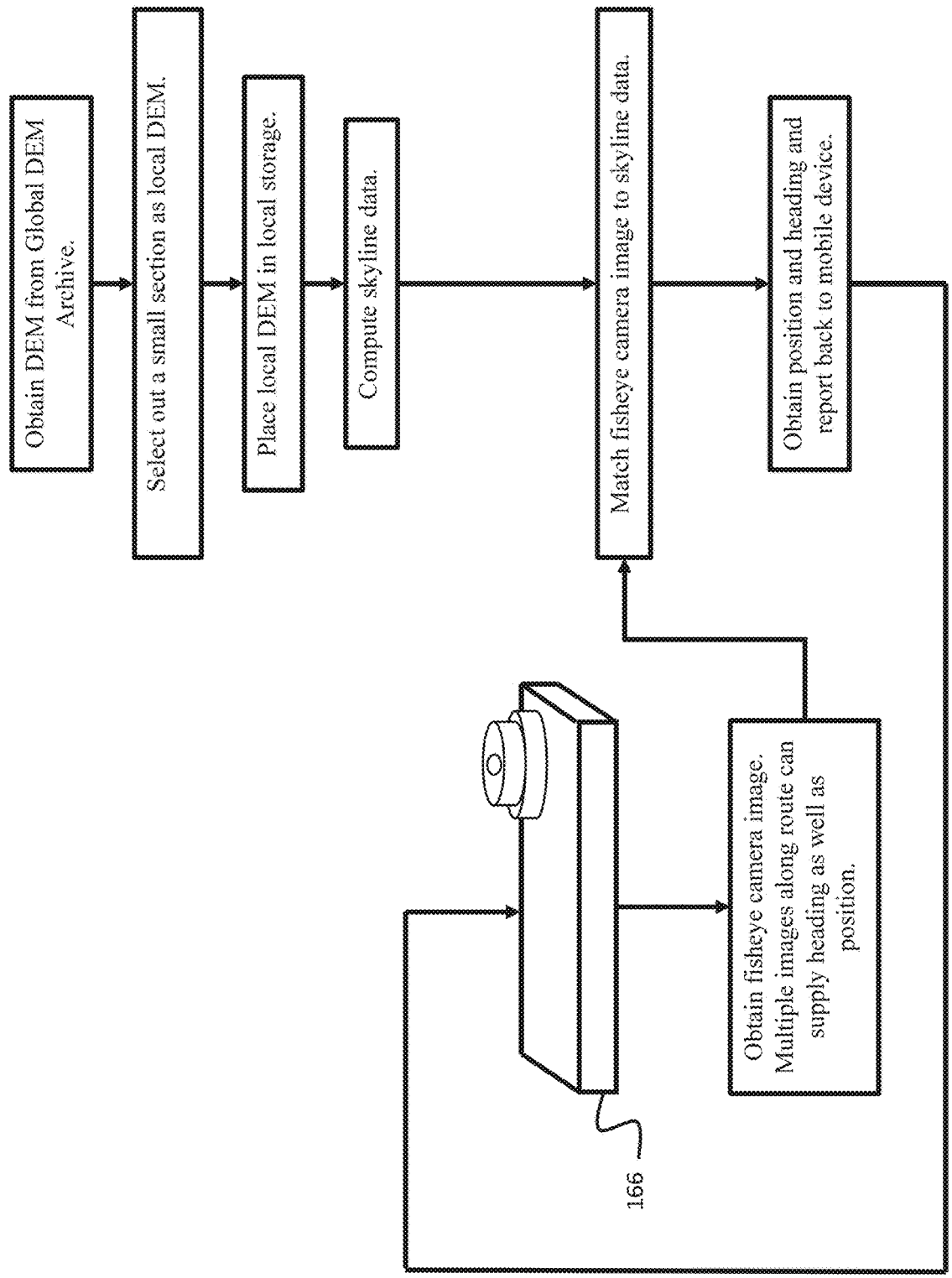
FIG. 2 is a schematic diagram illustrating an exemplary computer system according to an embodiment herein.
Figure 3:
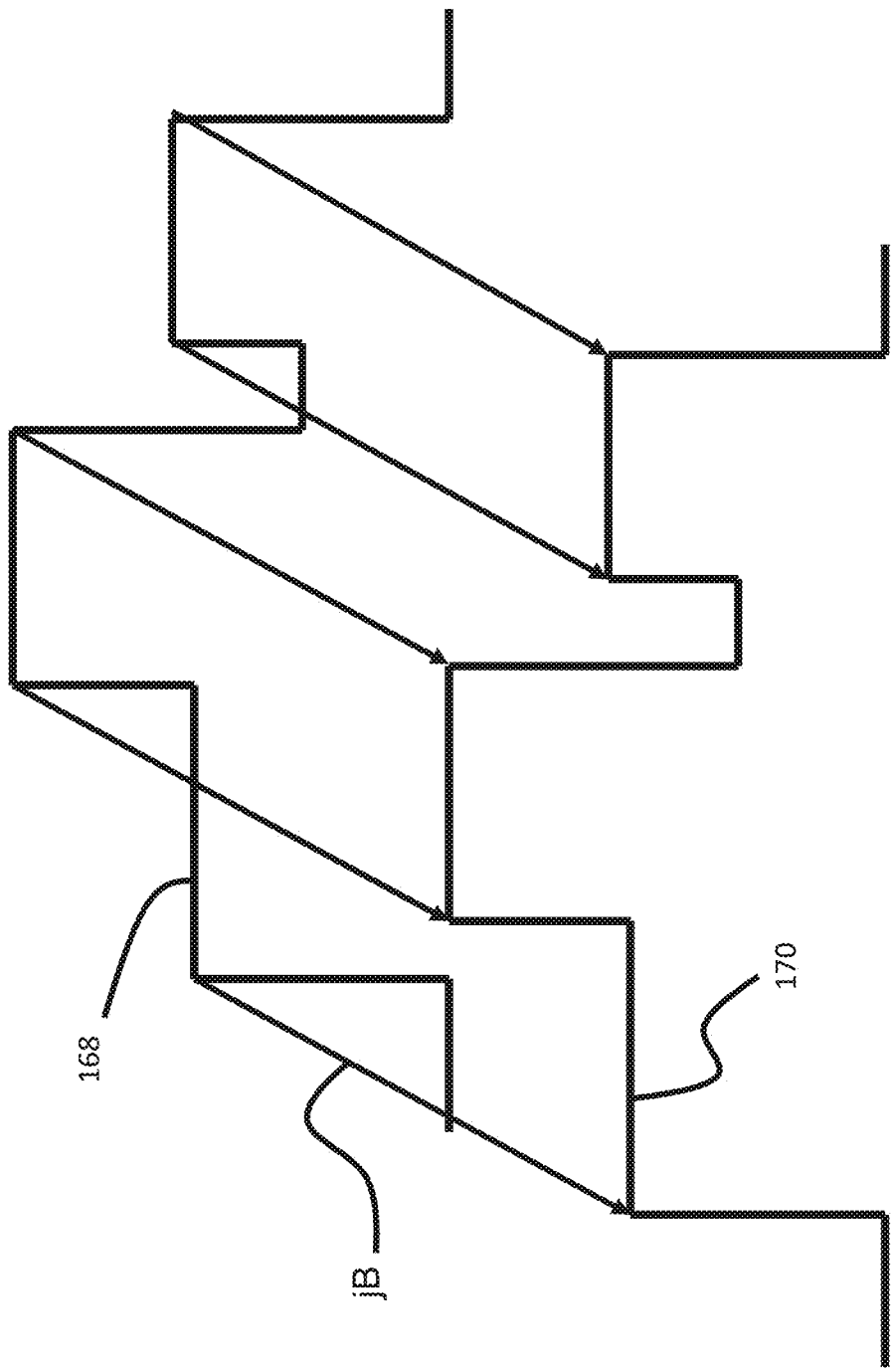
FIGS. 3 and 4 are views illustrating the process for generating a shadow volume map according to an embodiment herein.
Figure 4:
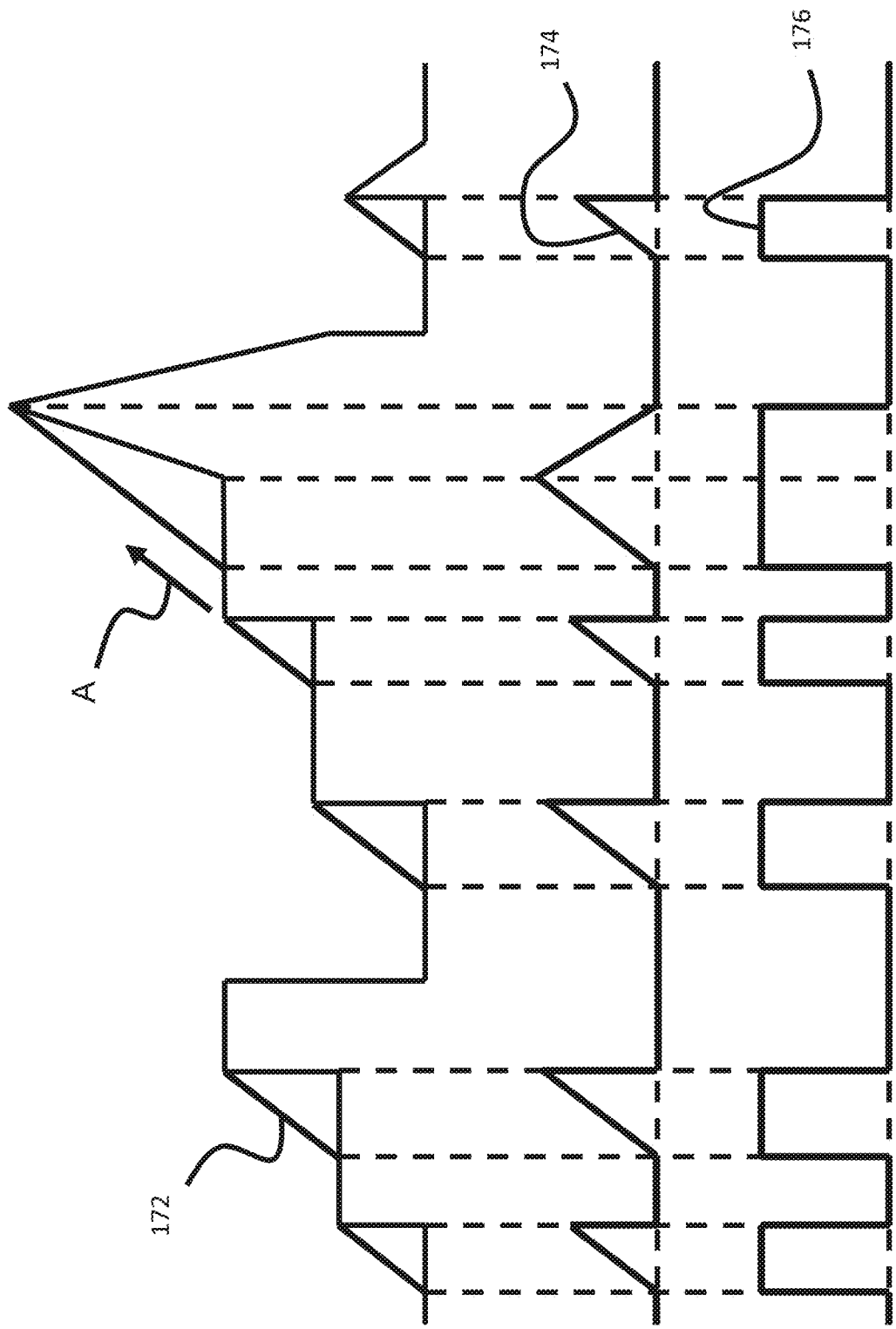
Figure 5:
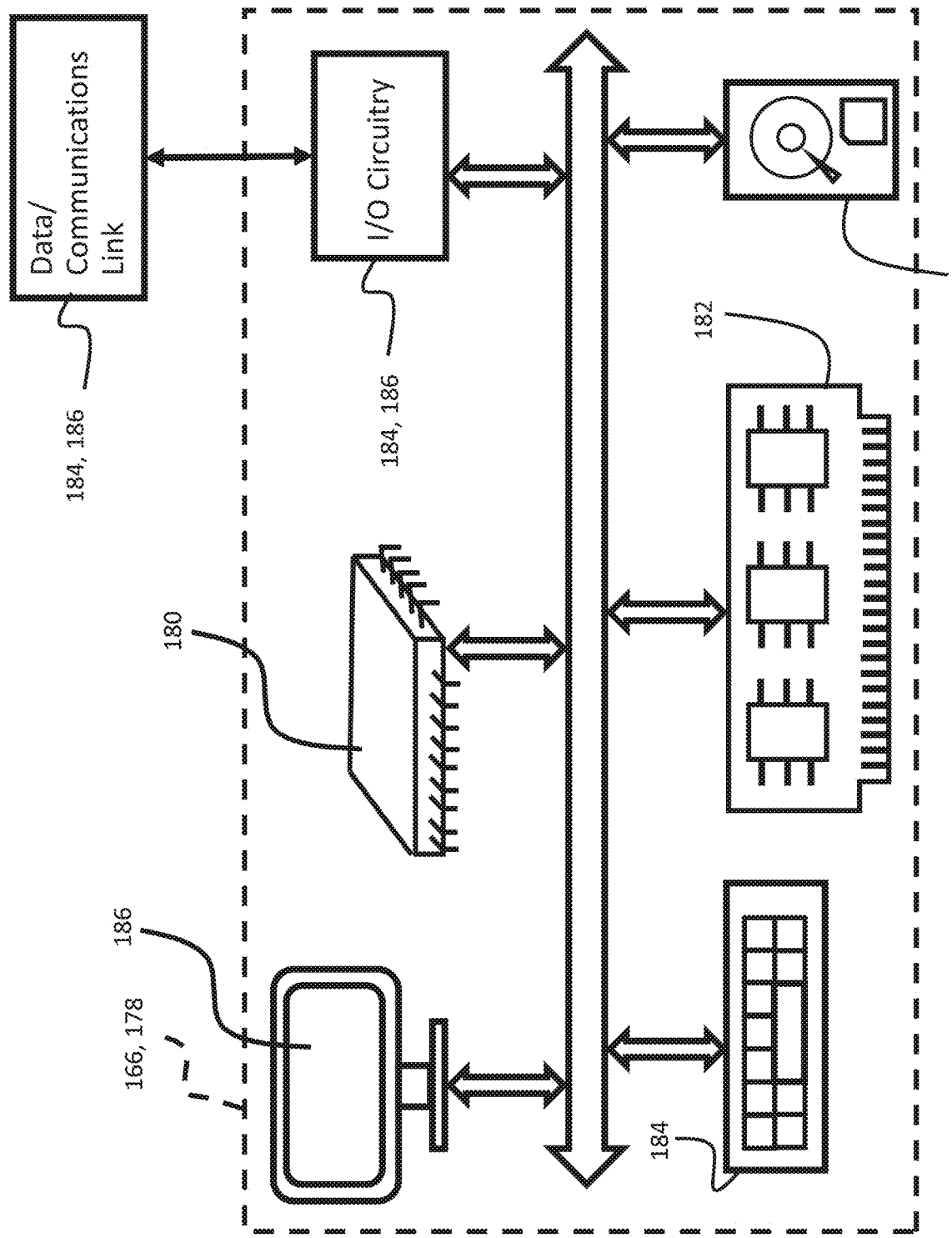
FIG. 5 is a schematic diagram illustrating a computing device for use with an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Referring to FIGS. 1 through 19, the embodiments disclosed herein include methods for determining an observer location 160 within an area using a computer system comprising one or more computing devices 166, 178. Each of the one or more computing devices may include one or more processors 180; one or more non-transitory, computer-readable media 182; one or more input devices 184; and one or more output devices 186. Some embodiments herein employ a Digital Elevation Model (DEM) of the area from a DEM source, which may then be stored in at least one of the one or more non-transitory, computer-readable media in the computer system.

One available source of DEMs is Light Detection and Ranging (LIDAR) imagery from satellites or aircraft. In addition, high-resolution remotely sensed DEMs are becoming increasingly available at low cost as a result of the application of techniques such as laser altimetry or synthetic aperture radar (SAR). DEMs can be commercially purchased for all major urban areas. Furthermore, software has been developed that can construct DEMs of, for example, major urban areas from the millions of tourist and other photographs of such areas available on the World Wide Web. The DEMs may be downloaded to a computing device, for example a server, that is part of the present computer system either directly from the satellite or aircraft or indirectly from a server owned by the operator of the satellite or aircraft or a server in the cloud or on the internet.

Some embodiments herein rely on determination of elevation angles at or near the maximum elevation angle that would allow a shadow to be cast by a point on the skyline at a specific location in the area under consideration for a given azimuth angle. A higher elevation angle would place the edge of the shadow short of the specific location, while a lower elevation angle would place the edge of the shadow past the specific location.

The observer's line of sight to a point on the skyline has the same azimuth and elevation angles as the illumination vector 164 that would cause the shadow of that point on the skyline to fall on the observers location, which coincides with the maximum elevation angle at which the observer location remains in shadow. By locating the coordinates of the location in the DEM where the maximum elevation angles, these being the elevation angles that cause the shadow of the skyline to fall on the location for the same or approximately the same azimuth angles, most closely approach the observer's reported elevation angles, the embodiments herein compute the coordinates of the observer's location with a practically useful level of accuracy.

An embodiment herein is directed to a method for use in generating area skyline information for an area using at least a plurality of azimuth angles $\varphi_i$. An example of the method includes the step of calculating (102), using a digital elevation model (DEM) that at least includes a portion corresponding to the area, for each of a plurality of locations within the area, a plurality of skyline elevation angles, each of the plurality of skyline elevation angles at least approximating the maximum elevation angle, within a predetermined level of accuracy, at which a corresponding one of the plurality of locations is in shadow for a corresponding one of the plurality of azimuth angles $\varphi_i$. In some examples, the step of calculating (102) the maximum elevation angle at which a corresponding one of the plurality of locations is in shadow for a corresponding one of the plurality of azimuth angles $\varphi_i$ comprises the step of initializing (104) a current elevation angle ($\theta$) by setting the current elevation angle $\theta$ equal to a corresponding initial elevation angle value. The initial elevation angle value, for example, may be selected from a range of zero to about five degrees. Higher initial elevation angle values may be selected depending on the nature of the terrain in the area of interest. If the plurality of locations within the area of interest are surrounded by tall structures, then a higher initial elevation angle value can be selected, which would expedite the step of calculating (102) the maximum elevation angle at which a corresponding one of the plurality of locations is in shadow. Accordingly, the initial elevation angle value, for example, may well be selected from a range of zero to about thirty degrees.

In some embodiments herein, the step of calculating (102) the maximum elevation angle at which a corresponding one of the plurality of locations is in shadow proceeds to the further step of executing (106) a shadow casting algorithm using the corresponding one of the plurality of azimuth angles $\varphi_i$, the current elevation angle $\theta$, and the DEM to determine whether or not the corresponding one of the plurality of locations is in shadow when the DEM is illuminated from a direction defined by the corresponding one of the plurality of azimuth angles $\varphi_i$ and the current elevation angle $\theta$. If it is determined that the corresponding one of the plurality of locations is in shadow, then the process proceeds to the step of increasing (108a) the current elevation angle $\theta$ by an increment ($\Delta\theta$). The steps of executing (106) a shadow casting algorithm to determine whether or not the corresponding one of the plurality of locations is in shadow and increasing the current elevation angle $\theta$ by an increment $\Delta\theta$ are repeated as long as the corresponding one of the plurality of locations remains in shadow until a value of the current elevation angle $\theta$ is first reached, for the corresponding one of the plurality of locations and the corresponding one of the plurality of azimuth angles $\varphi_i$, at which the corresponding one of the plurality of locations is no longer in shadow.

At this point in the process, the corresponding one of the plurality of locations is no longer in shadow at the current value of the elevation angle $\theta$. Therefore, the maximum elevation angle at which a corresponding one of the plurality of locations is in shadow will be between the current value of the elevation angle and the current value of the elevation angle minus $\Delta\theta$. By judicious selection of $\Delta\theta$, the maximum elevation angle at which a corresponding one of the plurality of locations is in shadow can be determined with sufficient accuracy to permit localization, i.e. determination of the map or grid coordinates, of a target location within an area with at least a practically useful level of accuracy. The angle increment $\Delta\theta$ is, of course, greater than zero and can be made very small. However, the smaller $\Delta\theta$ is, the higher the computational burden on the computer system will be. However, the increased computational burden may not result in increased accuracy in the localization of the target location as the accuracy of localization may be limited by the resolution of the DEM. Practical values for $\Delta\theta$ may be, for example, in the range of from about 0.1 degree to about five degrees. Preferably, $\Delta\theta$ may be, for example, selected such that for the most distant visible point in the skyline a $\Delta\theta$ change in the elevation angle of the illumination vector will result in about a one pixel shift in the position of the projection of that skyline point on the ground in a top view image of the DEM. More preferably, $\Delta\theta$ may be, for example, selected such that for the most distant visible point in the skyline a $\Delta\theta$ change in the elevation angle of the illumination vector will result in about a half pixel shift in the position of the projection of that skyline point on the ground in a top view image of the DEM.

It should be noted that "target location" as used herein is simply the location of interest in the area, or the corresponding location in the DEM, for which the corresponding grid or map coordinates are sought. The observer location, which is the location of the observer reporting the target location skyline information, is an example of a target location.

The exemplary embodiment of the method for use in generating area skyline information then proceeds to the step of providing, as one of the plurality of skyline elevation angles that corresponds to the corresponding one of the plurality of locations and the corresponding one of the plurality of azimuth angles $\varphi_i$, a value within a predetermined range of the value of the current elevation angle $\theta$, which is the first elevation angle reached at which the corresponding one of the plurality of locations is no longer in shadow for the corresponding one of the plurality of locations and the corresponding one of the plurality of azimuth angles $\varphi_i$. Alternatively, a value within a predetermined range of an elevation angle value that is less by $\Delta\theta$ than the value of the current elevation angle $\theta$, which was the first elevation angle reached at which the corresponding one of the plurality of locations is no longer in shadow for the corresponding one of the plurality of locations and the corresponding one of the plurality of azimuth angles $\varphi_i$.

Examples of suitable predetermined ranges may be $\Delta\theta$ or plus or minus $\Delta\theta$. In some examples, the final value of the current elevation angle $\theta$, which was the first elevation angle reached at which the corresponding one of the plurality of locations is no longer in shadow for the corresponding one of the plurality of locations and the corresponding one of the plurality of azimuth angles $\varphi_i$, may be provided as one of the plurality of skyline elevation angles that corresponds to the corresponding one of the plurality of locations and the corresponding one of the plurality of azimuth angles $\varphi_i$. In some examples, the final value of the current elevation angle $\theta$ minus $\Delta\theta$ may be provided as one of the plurality of skyline elevation angles that corresponds to the corresponding one of the plurality of locations and the corresponding one of the plurality of azimuth angles $\varphi_i$. In some examples, an average of the final value of the current elevation angle $\theta$ and the final value of the current elevation angle $\theta$ minus $\Delta\theta$ may be provided as one of the plurality of skyline elevation angles that corresponds to the corresponding one of the plurality of locations and the corresponding one of the plurality of azimuth angles $\varphi_i$.

In the typical embodiments of the methods disclosed herein for generating area skyline data, after the loop for iterating over the incrementally changing elevation angle is completed and after the loop for iterating over the plurality of azimuth angles $\varphi_i$ is completed, the resulting set of area elevation angle values for each grid or pixel location can be accumulated and stored in an area skyline data map, also referred to herein as a panoramic skyline map, which may be a data structure or function of the form $PSL(x,y, \varphi_i)$. $PSL(x,y, \varphi_i)$ provides or returns the corresponding area skyline elevation angle for any specified one of the plurality of locations (x,y) and any specified one of the plurality of azimuth angles $\varphi_i$. Further computational efficiencies may be realized by limiting the plurality of locations (x,y) to areas of the DEM image labeled as ground, or outdoor areas, as the observer is unlikely to be located inside buildings or solid objects. Limiting the calculations to areas labeled as ground may be accomplished, for example, by using masks.

Area skyline data may also be generated using methods that work in reverse of the method described above. In such embodiments, the elevation angle $\theta$ is initialized to a high angle value, such as 90 degrees or less as permitted by the expected upper limit of the area elevation angles, and then the elevation angle $\theta$ is decremented by $\Delta\theta$ at the end of each iteration of the loop for iterating over the incrementally changing elevation angle. In this case, the particular location would initially not be in shadow, which can be thought of as the location being in the light, and the loop for iterating over the incrementally changing elevation angle would be repeated until an elevation angle is first reached at which the particular location transitions from not being in shadow to being in shadow. The value of the elevation angle $\theta$ at the completion of the last iteration of the loop for iterating over the incrementally changing elevation angle, also referred to herein as the final value of the elevation angle $\theta$, may be provided as one of the plurality of skyline elevation angles that corresponds to the corresponding one of the plurality of locations and the corresponding one of the plurality of azimuth angles $\varphi_i$.

In some examples of methods where the elevation angle is decremented, the final value of the current elevation angle θ plus Δθ may be provided as one of the plurality of skyline elevation angles that corresponds to the corresponding one of the plurality of locations and the corresponding one of the plurality of azimuth angles $\varphi_i$. In some examples of methods where the elevation angle is decremented, an average of the final value of the current elevation angle θ and the final value of the current elevation angle θ plus Δθ may be provided as one of the plurality of skyline elevation angles that corresponds to the corresponding one of the plurality of locations and the corresponding one of the plurality of azimuth angles $\varphi_i$.

Accordingly, examples of methods for generating area skyline data in accordance with the embodiments herein may include the step of increasing or decreasing (108) the current elevation angle θ by an increment (Δθ) depending upon the initial elevation angle value. Such examples further comprise repeating (110) the steps of executing (106) a shadow casting algorithm to determine whether or not the corresponding one of the plurality of locations is in shadow and increasing or decreasing (108) the current elevation angle θ by an increment Δθ, while the corresponding one of the plurality of locations has not transitioned between being in shadow or not being in shadow until a final value of the current elevation angle θ is first reached, at which the corresponding one of the plurality of locations has transitioned from being in shadow to not being in shadow or vice versa for the corresponding one of the plurality of locations and the corresponding one of the plurality of azimuth angles $\varphi_i$. Such examples further include the step of providing (112), as one of the plurality of skyline elevation angles that corresponds to the corresponding one of the plurality of locations and the corresponding one of the plurality of azimuth angles $\varphi_i$, a value within a predetermined range of the final value of the current elevation angle θ. Alternatively an elevation angle value within a predetermined range of an elevation angle value that is less or more by Δθ than the final value of the current elevation angle θ may be provided as one of the plurality of skyline elevation angles that corresponds to the corresponding one of the plurality of locations and the corresponding one of the plurality of azimuth angles $\varphi_i$, depending upon whether the current elevation angle θ was being incrementally increased or decreased.

The DEM is a three-dimensional surface model of at least the area of interest and is of the form z(x,y), wherein z is the vertical elevation of the surface model above a grid location on a reference surface 161. At least a portion of the reference surface corresponds to the area and x and y are the coordinates of the grid location on the reference surface. There is a grid location (x,y) on the reference surface corresponding to each of the plurality of locations in the area, and z(x,y) is an array of elevation values with each elevation value in z(x,y) corresponding to a grid location (x,y). The DEM comprises elevation data for z at $N_x$ by $N_y$ grid locations (x,y) with spacing Δx and Δy.

In some example embodiments herein, executing (106) a shadow casting algorithm to determine if the corresponding one of the plurality of locations is in shadow comprises the step of constructing (114) an illumination vector A=[$A_x$,$A_y$,$A_z$], where $A_x$=cos($\varphi$)·cos(θ), $A_y$=sin($\varphi$)·cos(θ), and $A_z$=sin(θ), for a given azimuth angle $\varphi$ and a given elevation angle θ that are being used to define the direction of illumination. In some embodiments herein, $\varphi$ may be the corresponding one of the plurality of azimuth angles $\varphi_i$ and θ may be the current elevation angle from one of the methods for generating area skyline data. In some embodiments herein, $\varphi$ may be the corresponding one of the plurality of azimuth angles $\varphi_i$ and θ may be one of the plurality of target elevation angles $\theta_i$. In some embodiments herein, $\varphi$ may be the corresponding one of the plurality of azimuth angles $\varphi_i$, or an incrementally altered version thereof, and θ may be one of the plurality of target elevation angles $\theta_i$, or an incrementally altered version thereof, that are being used as illumination angles.

In some example embodiments herein, executing (106) a shadow casting algorithm to determine if the corresponding one of the plurality of locations is in shadow comprises the further step of constructing (116) a three-dimensional shift vector B=[$B_x$,$B_y$,$B_z$]=−A/C where C is the greater of the absolute value of $A_x$ and the absolute value of $A_y$. The shift vector B has the property that either $B_x$ or $B_y$ has unit length and points into the opposite direction of the illumination vector A.

In some example embodiments herein, executing (106) a shadow casting algorithm to determine if the corresponding one of the plurality of locations is in shadow comprises the further step of computing (118) a shadow surface SS(x,y), wherein the shadow surface SS(x,y) is an array of elevation values each corresponding to a grid location (x,y).

In some example embodiments herein, computing (118) a shadow surface SS(x,y) comprises:
 a) setting (120) SS(x,y) equal to z(x,y) on an element by element basis such that SS(x,y) and z(x,y) have the same elements at the same grid locations (x,y), such that initially current SS(x,y) is equal to z(x,y);
 b) setting (122) an index variable j equal to one;
 c) shifting (124) z(x,y) by a vector obtained by multiplying the shift vector B by j to obtain a shifted z(x,y), wherein z(x,y) is shifted on an element by element basis by shifting each element of z(x,y) from its current grid location (x,y) to a new grid location (x+j$B_x$, y+j$B_y$) while changing the element's value to z+j$B_z$ to obtain the shifted z(x,y);
 d) comparing (126) each element of the current SS(x,y) with the corresponding element of the shifted z(x,y), which is the element of the shifted z(x,y) for the same grid location (x,y) as the element of current SS(x,y), and providing for each element of a new SS(x,y) to be set to the greater of the corresponding element of the current SS(x,y) and the corresponding element of the shifted z(x,y) to obtain the new SS(x,y), which will serve as the current SS(x,y) for an iteration of the process for computing the shadow surface that is to be performed next;
 e) incrementing (128) the index variable j by one; and
 f) repeating (130) steps c, d, and e for j equal to 2 through N to obtain a completely computed shadow surface SS(x,y), wherein N is obtained by adding one to the closest integer that is less than or equal to the difference between the highest value among the elements of z(x,y) and the lowest value among the elements of z(x,y) divided by the absolute value of $B_z$.

In some example embodiments herein, executing (106) a shadow casting algorithm to determine if the corresponding one of the plurality of locations is in shadow comprises the further step of computing (132) a shadow volume map SV(x,y) for the DEM illuminated from the illumination angles $\varphi$ and θ by subtracting z(x,y) from SS(x,y). The shadow volume map SV(x,y) is an array of elements with each element of SV(x,y) corresponding to a grid location (x,y). The surface model height above the reference surface, z(x,y), is subtracted from SS(x,y) on an element by element basis by subtracting from each element of SS(x,y) a corresponding element of z(x,y).

Every location in the DEM or in the area, including the corresponding one of the plurality of locations and the target location for example, has a corresponding grid location (x,y). To determine if a location in the DEM or in the area, such as any of the plurality of locations including the corresponding one of the plurality of locations and the target location for example, is in shadow, the grid location (x,y) of the location of interest is used to calculate a corresponding point (x,y,h(x,y)+H) that is located at a height h(x,y)+H above the corresponding grid location (x,y). The function or data structure h(x,y) is the topographic ground height above the reference surface of the DEM at grid location (x,y). The topographic ground height h(x,y) is a subset of z(x,y) and is included in the DEM. The quantity H is an observer height above the ground associated with a target location skyline information. Zero is within the range of possible values for H. The observer height H may be set to a value selected from the group consisting of zero and a reasonable non-zero estimate if no specific value for H is available or if the effect of H is not significant. The location in the DEM or in the area, such as any of the plurality of locations including the corresponding one of the plurality of locations and the target location for example, is in shadow when SV(x,y)>H at the corresponding grid location (x,y) of the location in the DEM or in the area.

Figure 6:
FIG. 6 illustrates a shadow volume map according to an embodiment herein.
Figure 7:
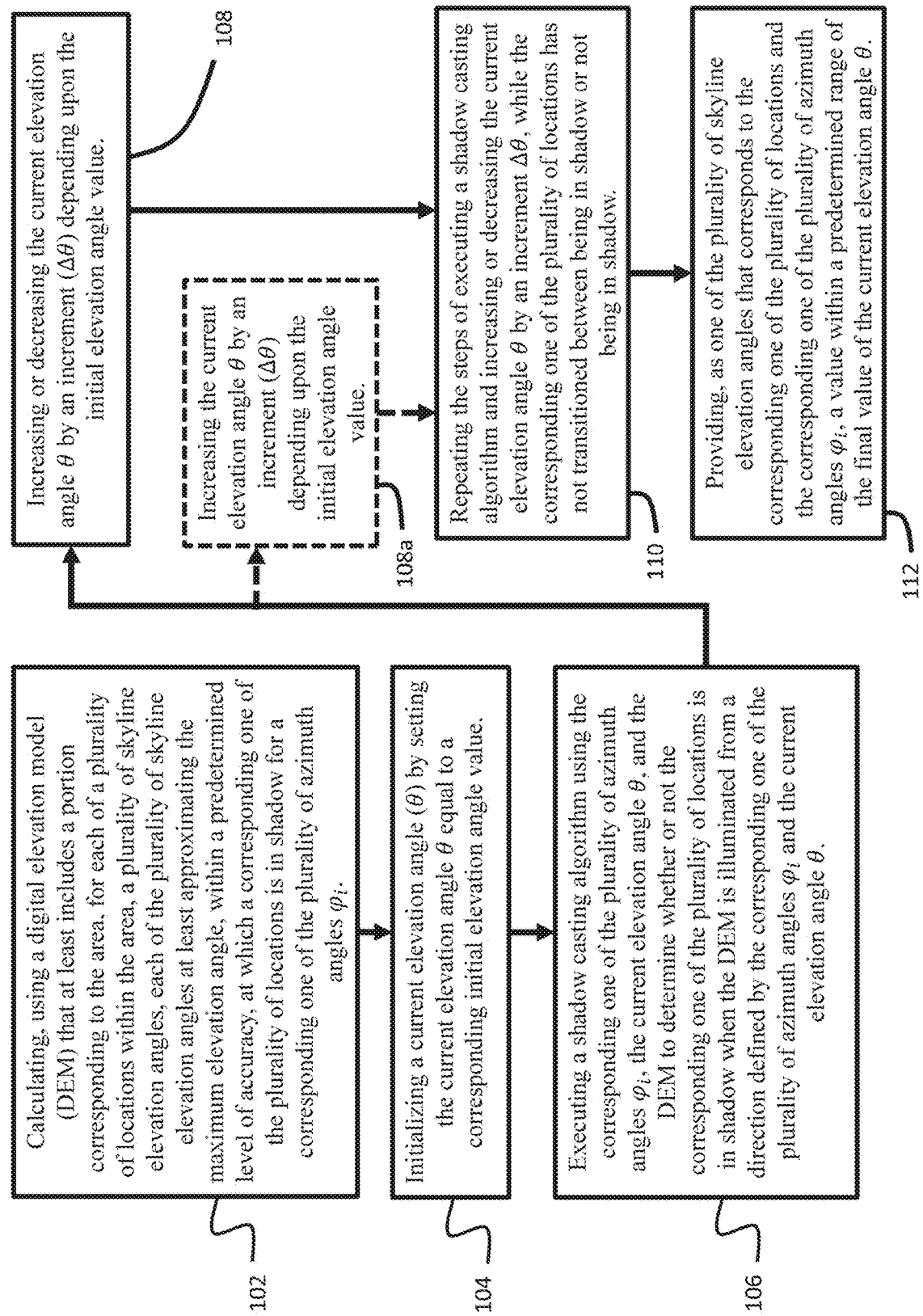
FIG. 7 is a flow diagram illustrating a method for generating area skyline data according to an embodiment herein.
Figure 8:
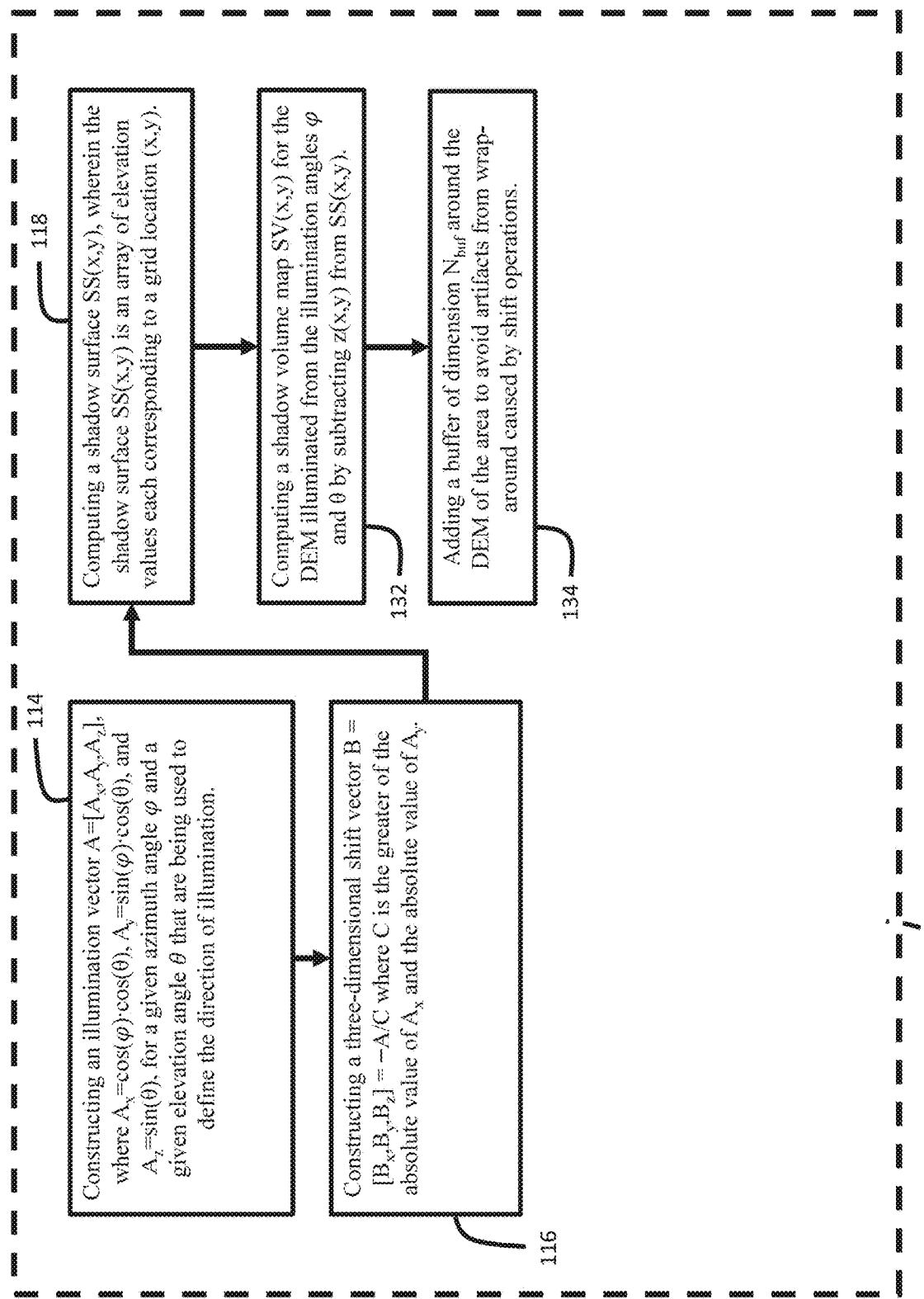
FIG. 8 is a flow diagram illustrating a shadow casting algorithm for use with the embodiments herein.
Figure 9:
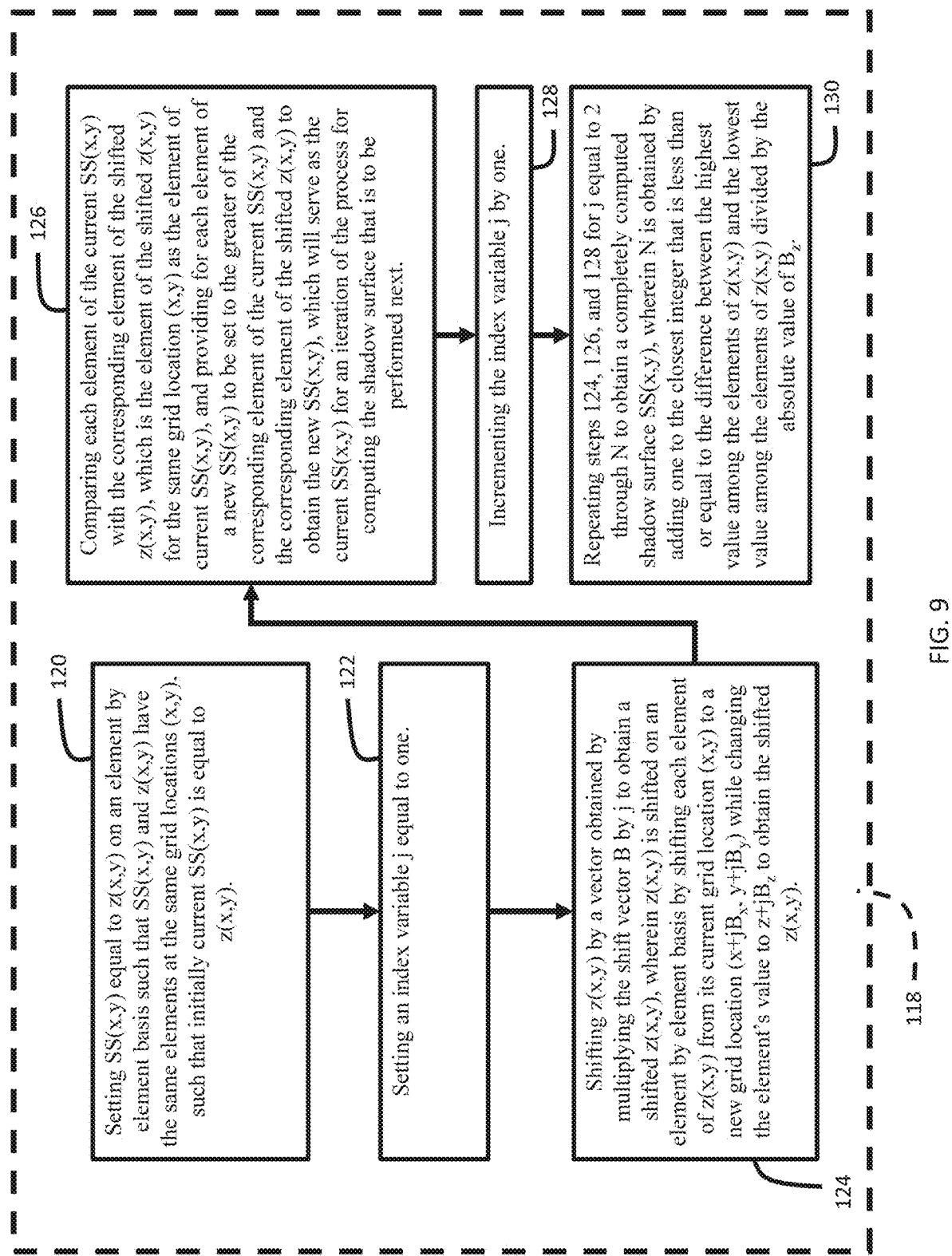
FIG. 9 is a flow diagram illustrating a process for computing a shadow surface for use with the embodiments herein.
Figure 12:
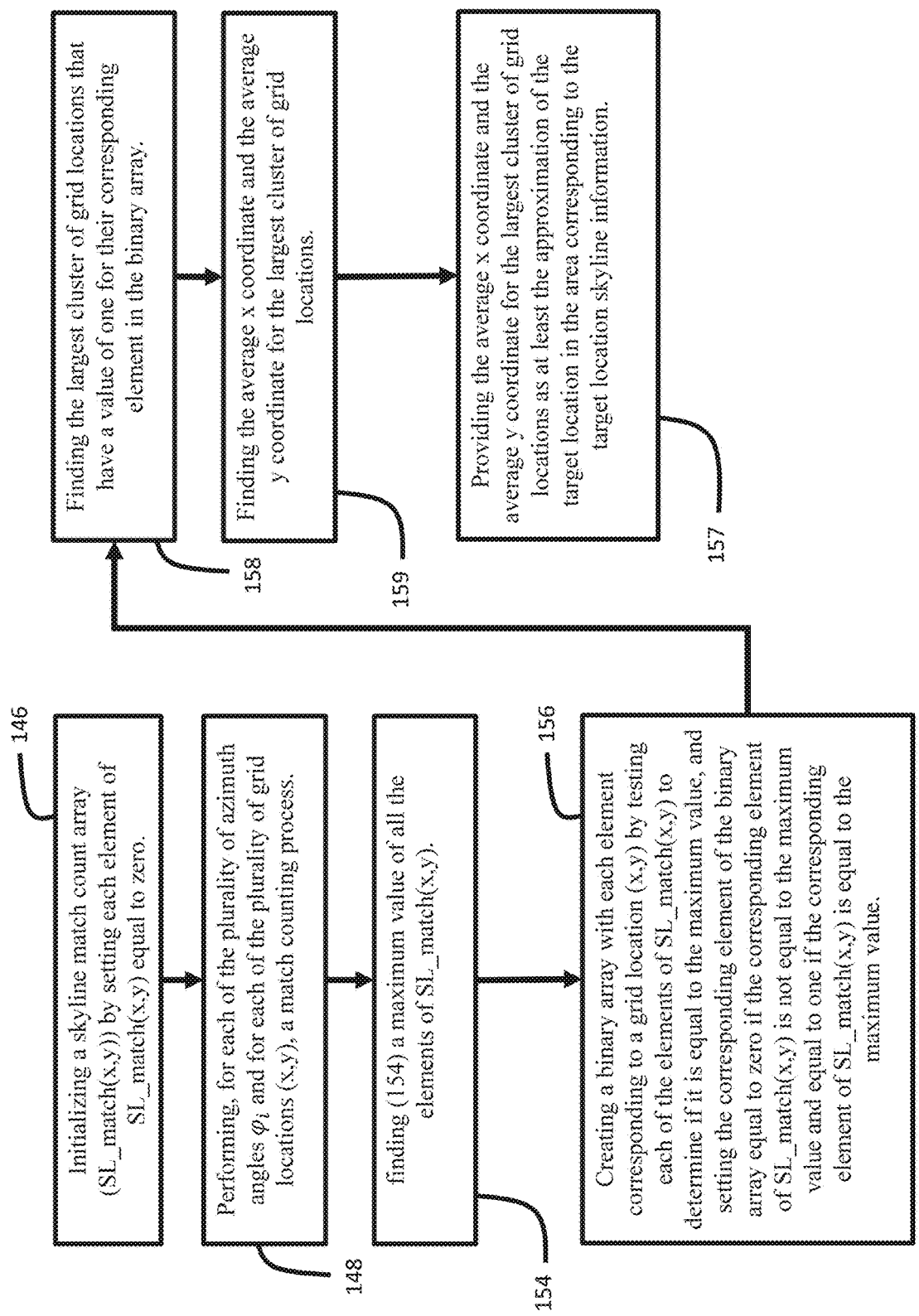
FIG. 12 is a flow diagram illustrating a process for determining a target location in an area by counting matches between target location skyline elevation angles and area skyline elevation angles according to another embodiment herein.
Figure 13:
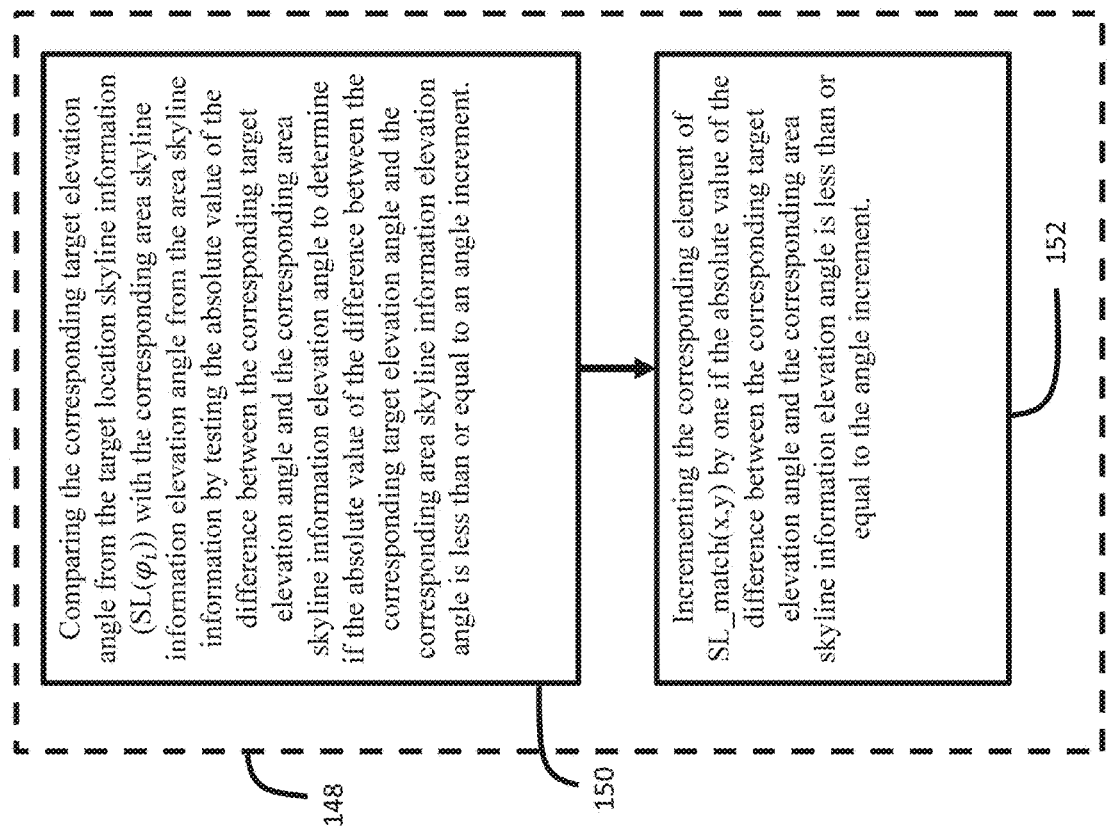
FIG. 13 is a flow diagram illustrating a process for counting matches between target location skyline elevation angles and area skyline elevation angles according to an embodiment herein.
Figure 14:
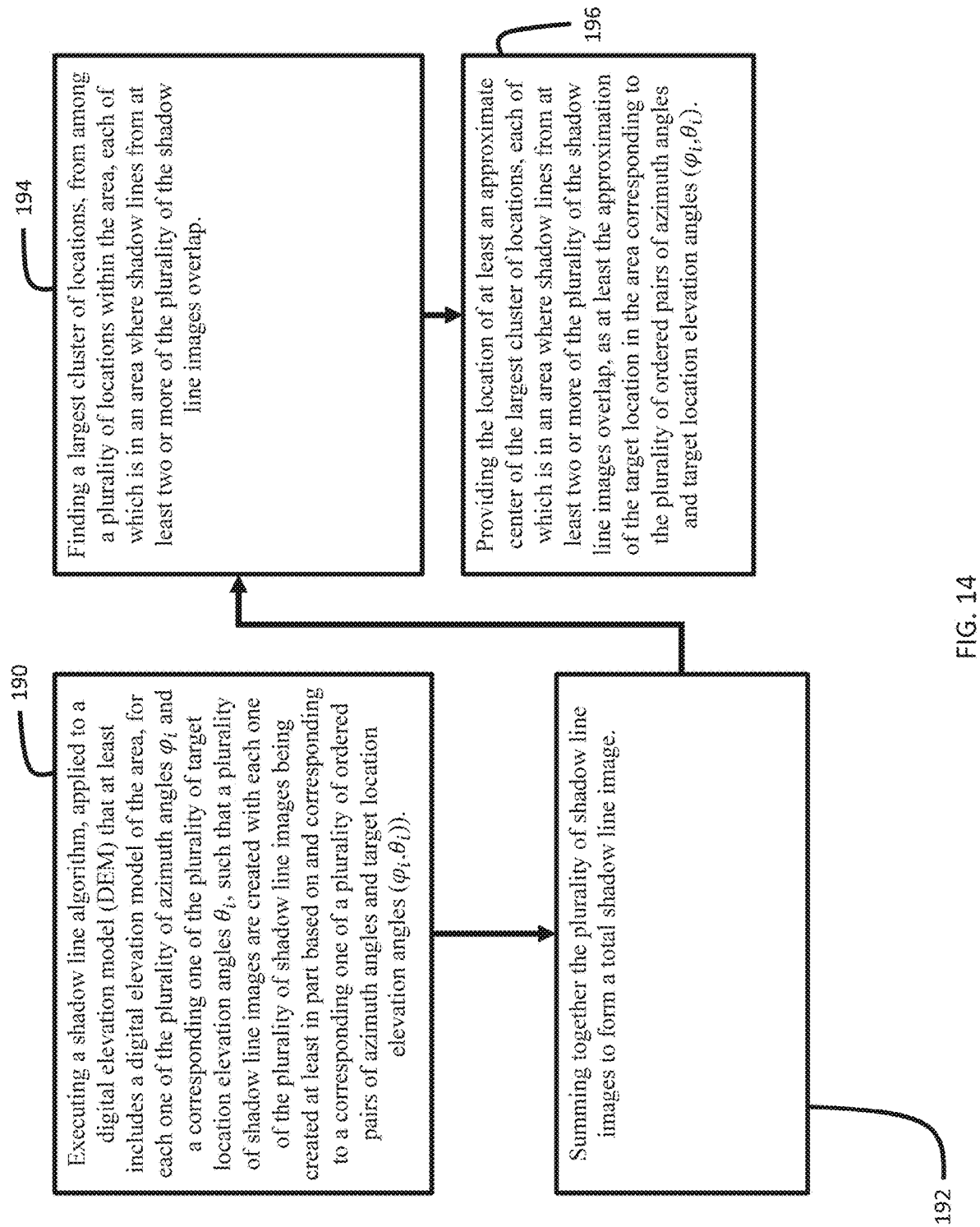
FIG. 14 is a flow diagram illustrating a process for determining a target location in an area by using a shadow line algorithm according to an embodiment herein.
Figure 15:
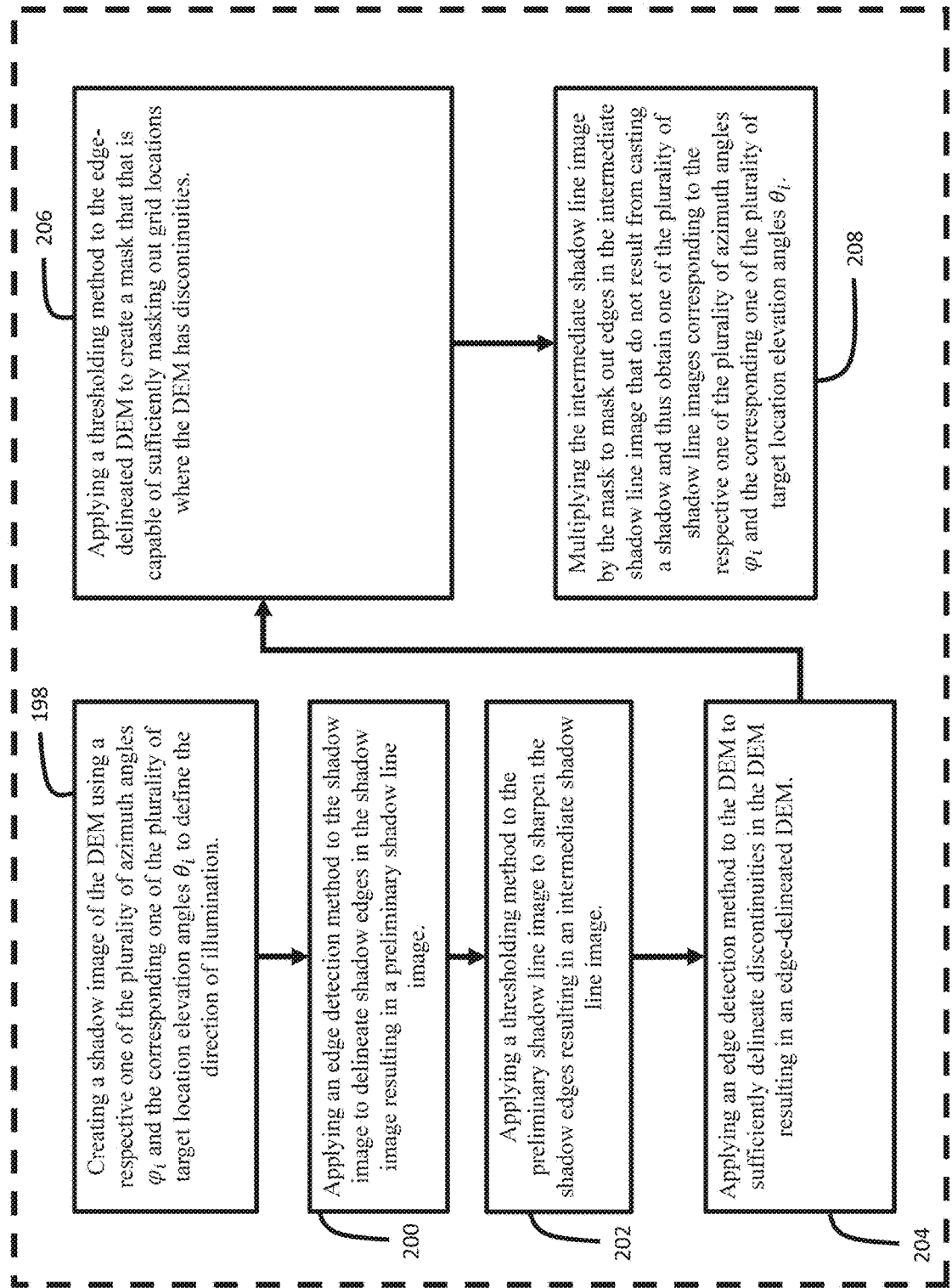
FIG. 15 is a flow diagram illustrating the process for determining a target location in an area using a single source shadow line method according to an embodiment herein.
Figure 16:
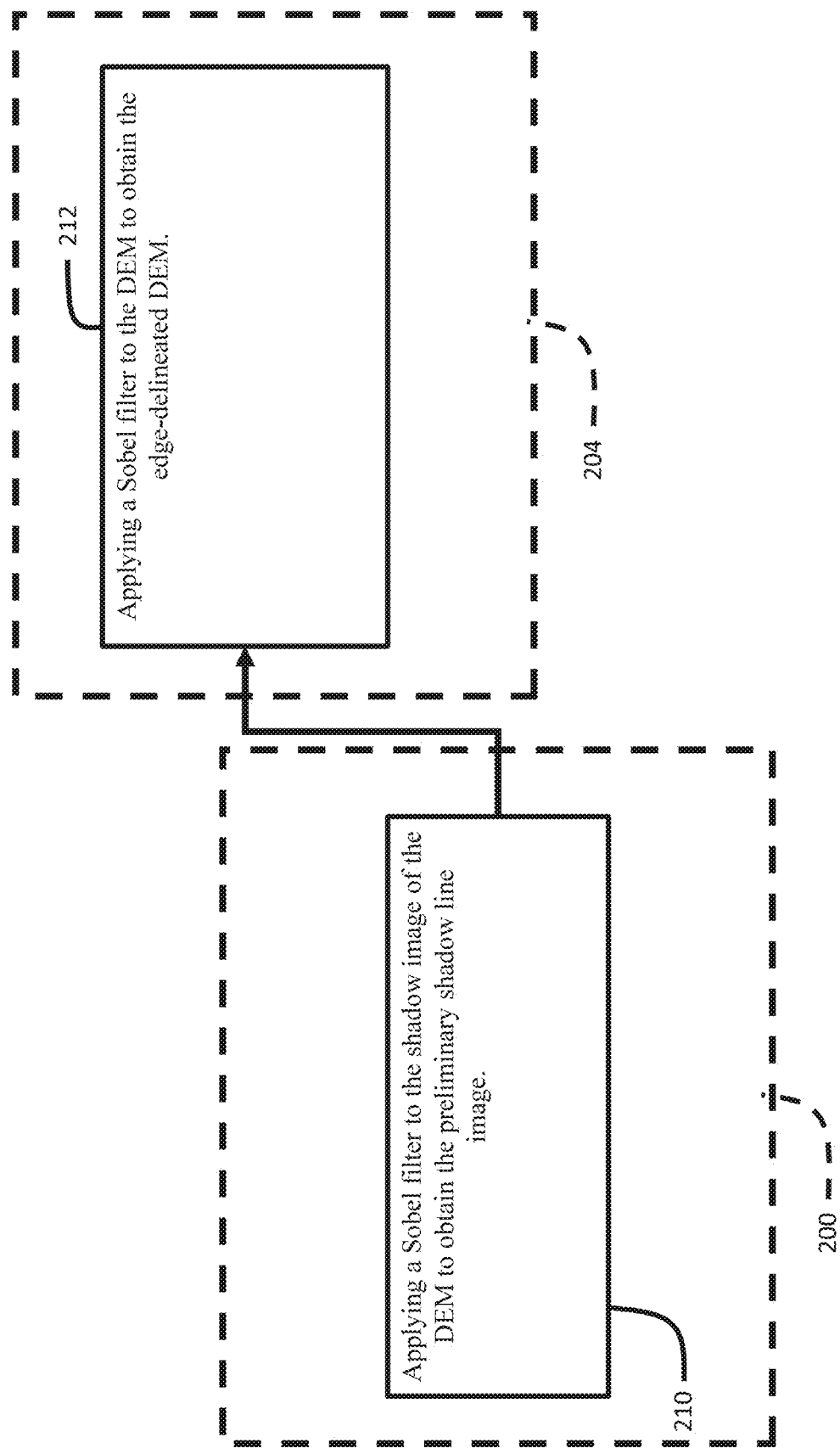
FIG. 16 is a flow diagram illustrating the process for determining a target location in an area using a single source shadow line method that uses a Sobel filter according to an embodiment herein.
Figure 17:
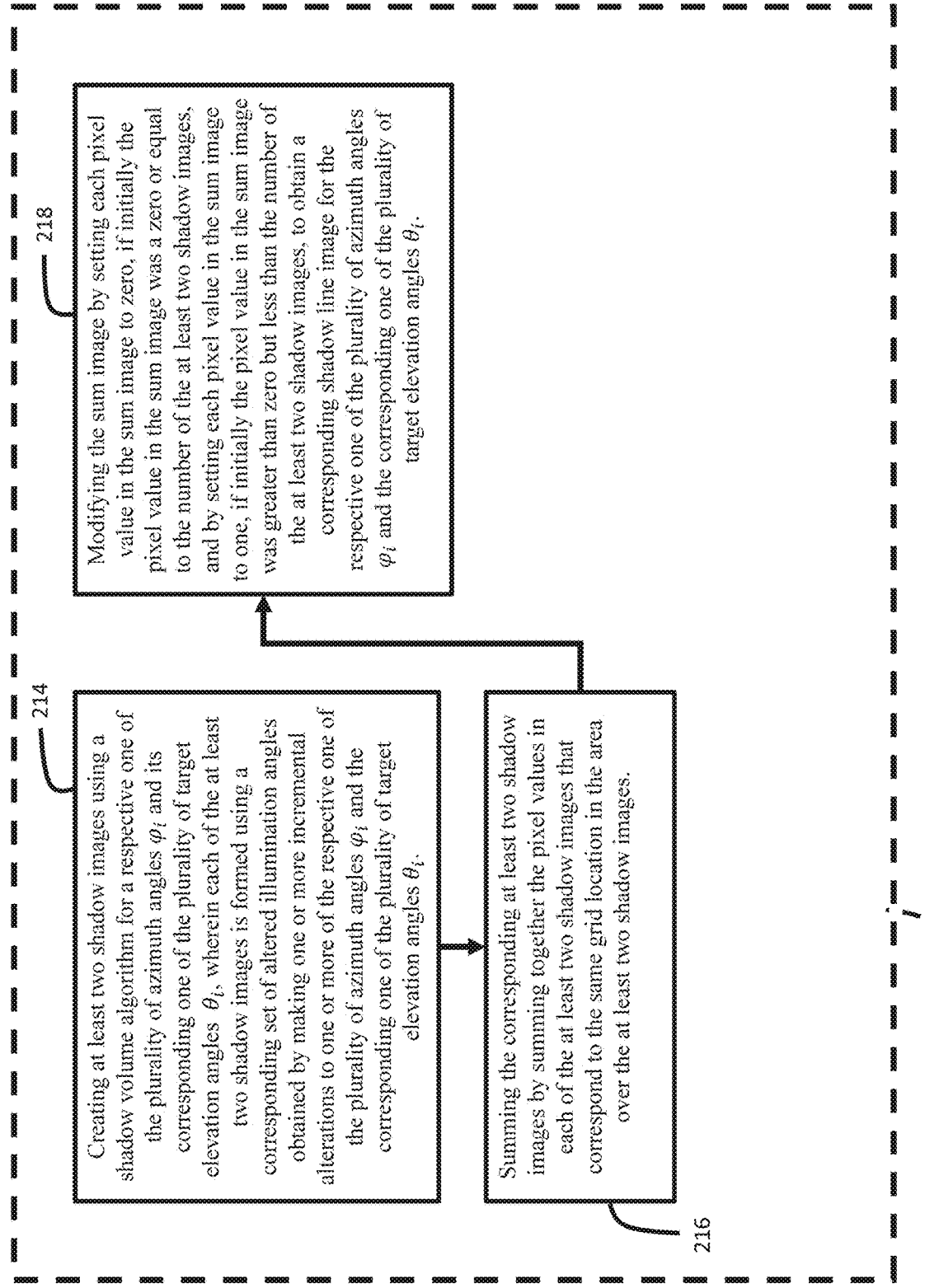
FIG. 17 is a flow diagram illustrating the process for determining a target location in an area using a dual or higher source shadow line method according to an embodiment herein.
Figure 18:
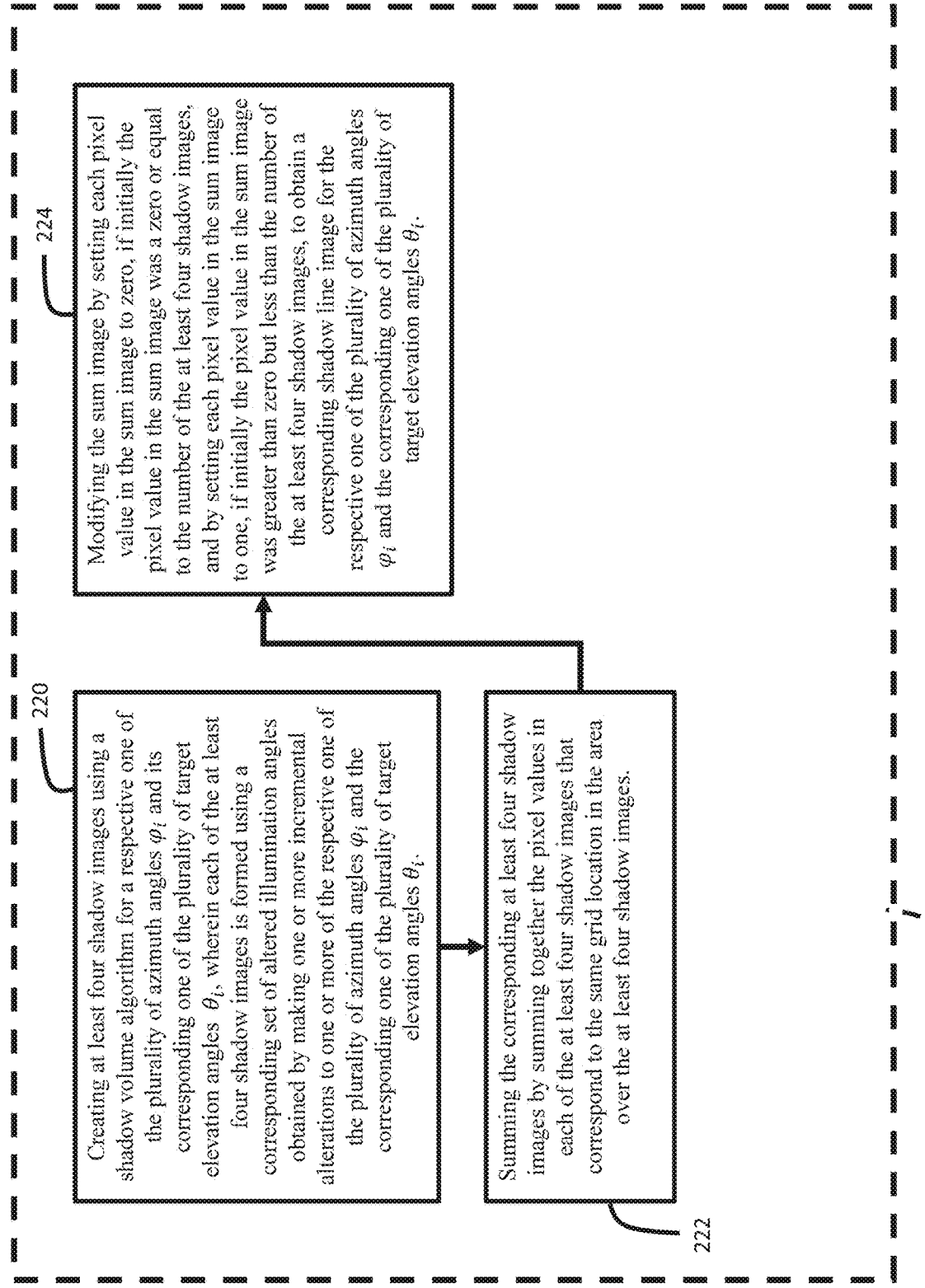
FIG. 18 is a flow diagram illustrating the process for determining a target location in an area using a quadruple or higher source shadow line method according to an embodiment herein.

An illustrative example of a shadow volume map can be seen in FIG. 6. A shadow is cast on any observer having an elevation H above the ground at a point (x,y,h(x,y)+H) when SV(x,y)>H, where h(x,y) is the topographic ground height above the horizontal plane of the DEM at grid location (x,y).

In instances where the ground in the area is fairly flat such that the effect of the topography of the ground is negligible, h(x,y) can be equal to zero for all ground locations (x,y). As h(x,y) is part of z(x,y), the effect of ground topography is automatically corrected for when z(x,y) is subtracted from SS(x,y). The value for H is greater than or equal to zero and may typically be in the range of zero to may be about ten feet. If the observer is a smartphone with a fisheye lens and is placed on or near the ground then H may be taken to be zero. In such a case, location (x,y) will be in shadow when SV(x,y)>0, and this condition is contemplated as being within the scope of the appended claims because H=0 is within the range of possible values for H. In the event that the observer is held at chest height or positioned atop a vehicle, then H may range from about four feet to about ten feet.

In some embodiments herein, it may be desirable to generate a shadow image of the DEM. This result can be obtained by subtracting one of z(x,y) and z(x,y)+H from SS(x,y) to obtain a shadow volume map SV(x,y) in the step of computing (132*a*) a shadow volume map SV(x,y) for the DEM illuminated from the illumination angles $\varphi_i$ and $\theta_i$ obtained from the target location skyline information. If H is negligibly small then z(x,y) is used, while z(x,y)+H may be used to account for the effect of a non-zero or significant observer height. The resulting shadow volume map SV(x,y) may then serve as the shadow image of the DEM for the respective one of the plurality of azimuth angles $\varphi_i$ and the corresponding one of the plurality of target location elevation angles $\theta_i$. In some embodiments herein, one or more of the respective one of the plurality of azimuth angles $\varphi_i$ and the corresponding one of the plurality of target location elevation angles $\theta_i$ are incrementally altered before being used as illumination angles for obtaining the shadow volume map SV(x,y) or the shadow image of the DEM.

The DEM may include a buffer zone around the portion of the DEM corresponding to the area of interest to prevent any artifacts due the wraparound feature of the shift operations from affecting or impacting the shadow surface SS(x,y) or the SV(x,y) of the area of interest. The buffer zone may be $N_{buf}$ pixels wide and extend around the DEM of the area of interest, where $N_{buf}$ may be greater than or equal to N as has already been defined herein. The buffer zone may be added before any shift operations are performed and may be removed after all shift operations are completed to provide and image of the DEM of the area of interest. Accordingly, the step of executing (106) a shadow casting algorithm may at least include the additional step of adding (134) a buffer of dimension $N_{buf}$ around the DEM of the area to avoid artifacts from wrap-around caused by shift operations.

Some embodiments herein, are directed to methods for determining at least an approximation of a target location within an area using at least in part corresponding target location skyline information comprising at least a plurality of azimuth angles $\varphi_i$ and a plurality of respective target location elevation angles $\theta_i$. The target location skyline information may be provided by an observer engaging in obtaining a first plurality of azimuth angle and elevation angle pairs corresponding to points 162 on a skyline viewable by the observer from the observer location. The first plurality of azimuth angle and elevation angle pairs, i.e. the plurality of azimuth angles $\varphi_i$ and the plurality of respective target location elevation angles $\theta_i$ of the target location skyline information, may then be stored in at least one of the one or more non-transitory, computer-readable media in the computer system or in an external data store for access by the computer system. In this instance, the target location would be the same as the observer location. The observer may be a person equipped with a compass and an inclinometer. Both measuring devices could, for example, be integrated into a weapons sight and a soldier could then just point at a plurality of points 162 in the surrounding skyline and these azimuth angles and elevation angles together with a digital surface model (DSM), also referred to herein as a DEM, would be enough to localize an observer, in other words determine the map or grid coordinates of the observer's location. Also, a person equipped with the compass and inclinometer can record azimuth angle and elevation angle (also known as inclination angle) pairs for several points on the skyline visible to him or her and then communicate this data to a remote computing device, for example a server or computer, that may be part of the computer system herein, and where the DEMs are stored, for the actual computation of the observer's location coordinates. The person can communicate the data using the touch screen or keyboard of a mobile computing device, such as a cellphone, smartphone, tablet, or laptop, which may be part of the computer system herein and has a communication link to the remote server. The computed coordinates of the observer location can then be communicated to the observer using the display of the same mobile computing device.

Another example of an observer is a person that has a smartphone 166 equipped with a fisheye lens mounted over the smartphone camera. The smartphone and fisheye lens combination is used to take north-facing and up-ward looking images. The images are circular images showing 360° views of the surroundings of the observer, the smart phone camera in this case. Because the north direction is known in the image, azimuth angles, customarily measured in the clockwise direction from the north direction, of various points on the skyline surrounding the observer can be determined. The elevation angle can be determined using the distance of the points on the skyline from the center of the image once the fisheye camera is calibrated by taking images of structures at known elevation angles. Alternatively, the elevation angle may be determined using lens formulas and the known geometry of the lens. This process can be done manually or using a computer with appropriate software in order to generation the first plurality of azimuth angle and elevation angle pairs.

Other examples of observers include all types of 360° cameras in communication with mobile computing devices such as cellphones, smartphones, tablets, or laptops, which are part of the digital electronic localization system herein. The 360° cameras may operate in the infrared or visible range and include mechanically scanned cameras, multi-lens cameras, and other omnidirectional cameras. The cameras may be placed on the ground on board a vehicle such as an autonomous, self-driving vehicle, a remote-controlled vehicle, or a crewed vehicle. The examples of observers given herein are not intended to be limiting but are provided for illustrative purposes.

The first plurality of azimuth angle and elevation angle pairs and a DEM for the area under consideration is essentially all that is needed to compute the coordinates of the observer's location using the embodiments herein. Some embodiments herein, for determining at least an approximation of a target location within an area, include the step of performing (136), for each of a plurality of locations within the area, a match counting method, wherein each of the plurality of locations for which match counting is being performed is referred to as a current location, the match counting method comprising:

a) comparing (138), for each of the plurality of azimuth angles $\varphi_i$, a skyline elevation angle corresponding to the current location and to a respective one of the plurality of azimuth angles $\varphi_i$ with a corresponding one of the plurality of target location elevation angles $\theta_i$ corresponding to the respective one of the plurality of azimuth angles $\varphi_i$, to determine if the skyline elevation angle corresponding to the current location and to the respective one of the plurality of azimuth angles $\varphi_i$ matches the corresponding one of the plurality of target location elevation angles corresponding to the respective one of the plurality of azimuth angles $\varphi_i$ within a practical level of accuracy; and b) counting (140) the total number of times the skyline elevation angle matches the corresponding one of the plurality of target location elevation angles within the practical level of accuracy upon iterating the step of comparing the skyline elevation angle with the corresponding one of the plurality of target location elevation angles over all the plurality of azimuth angles $\varphi_i$ so as to provide a match count for the current location.

Some embodiments herein, for determining at least an approximation of a target location within an area, include the further steps of finding (142) a largest cluster of locations, from among the plurality of locations, for each of which the match count is at least a plurality and providing (144) the location of at least an approximate center of the largest cluster of locations for which the match count is at least a plurality as at least the approximation of the target location in the area corresponding to the target location skyline information. The practical level of accuracy for matching the area skyline elevation angle for the current location to the corresponding target location elevation angle, for example, may be on the order of the greater of the incremental change in the area skyline elevation angle for the current location that would result in about a one pixel shift for the projection of the corresponding area skyline point relative to the current location and the error in the measurement or calculation of the area skyline elevation angle and/or the target location elevation angle.

Determining an approximation of a target location within an area means finding the coordinates of the target location within the area. These coordinates may take several forms. One form may be the row and column indexes (i,j) for a pixel corresponding to the target location in an image of the area. Another form may be the coordinates (x,y) for the target location or the corresponding pixel where $x \approx i \times \Delta x$, $y \approx j \times \Delta y$, and i and j are the pixel indexes for a pixel corresponding to the target location in an image of the area. Yet another form may be the longitude and latitude corresponding to the target location, which may be obtained by scaling x and y to represent actual distance on the ground and using them to extrapolate the target location longitude and latitude from a reference point, such as a corner, of the area having known longitude and latitude. The coordinates (x,y) are used herein as a generic stand-in for all these forms of coordinates, unless otherwise specified. In some examples herein, the coordinates may ultimately be converted to longitude and latitude form for presentation to a user or client of the system.

Some embodiments herein that are directed to methods for determining at least an approximation of a target location within an area using at least in part corresponding target location skyline information comprising at least a plurality of azimuth angles $\varphi_i$ and a plurality of respective target location elevation angles $\theta_i$ and using area skyline information for the area, include the step of initializing (146) a skyline match count array (SL_match(x,y)) by setting each element of SL_match(x,y) equal to zero, wherein each (x,y) corresponds to one of a plurality of grid locations in the area identified by corresponding coordinates x and y and wherein the area skyline information comprises a plurality of area skyline information elevation angles each corresponding to a corresponding one of the plurality of azimuth angles $\varphi_i$ for one or more grid locations (x,y).

This example includes the further step of performing (148), for each of the plurality of azimuth angles $\varphi_i$ and for each of the plurality of grid locations (x,y), a match counting process comprising:

comparing (150) the corresponding target elevation angle from the target location skyline information (SL($\varphi_i$)) with the corresponding area skyline information elevation angle from the area skyline information by testing the absolute value of the difference between the corresponding target elevation angle and the corresponding area skyline information elevation angle to determine if the absolute value of the difference between the corresponding target elevation angle and the corresponding area skyline information elevation angle is less than or equal to an angle increment; and incrementing (152) the corresponding element of SL_match(x,y) by one if the absolute value of the difference between the corresponding target elevation angle and the corresponding area skyline information elevation angle is less than or equal to the angle increment.

This example includes the further step of finding (154) a maximum value of all the elements of SL_match(x,y). This method proceeds to the step of creating (156) a binary array with each element corresponding to a grid location (x,y) by testing each of the elements of SL_match(x,y) to determine if it is equal to the maximum value, and setting the corresponding element of the binary array equal to zero if the corresponding element of SL_match(x,y) is not equal to the maximum value and equal to one if the corresponding element of SL_match(x,y) is equal to the maximum value. This method further proceeds to the step of finding (158) the largest cluster of grid locations that have a value of one for their corresponding element in the binary array. Another step in this example is finding (159) the average x coordinate and the average y coordinate for the largest cluster of grid locations. Yet another step in this example is providing (157) the average x coordinate and the average y coordinate for the largest cluster of grid locations as at least the approximation of the target location in the area corresponding to the target location skyline information.

Figure 19:
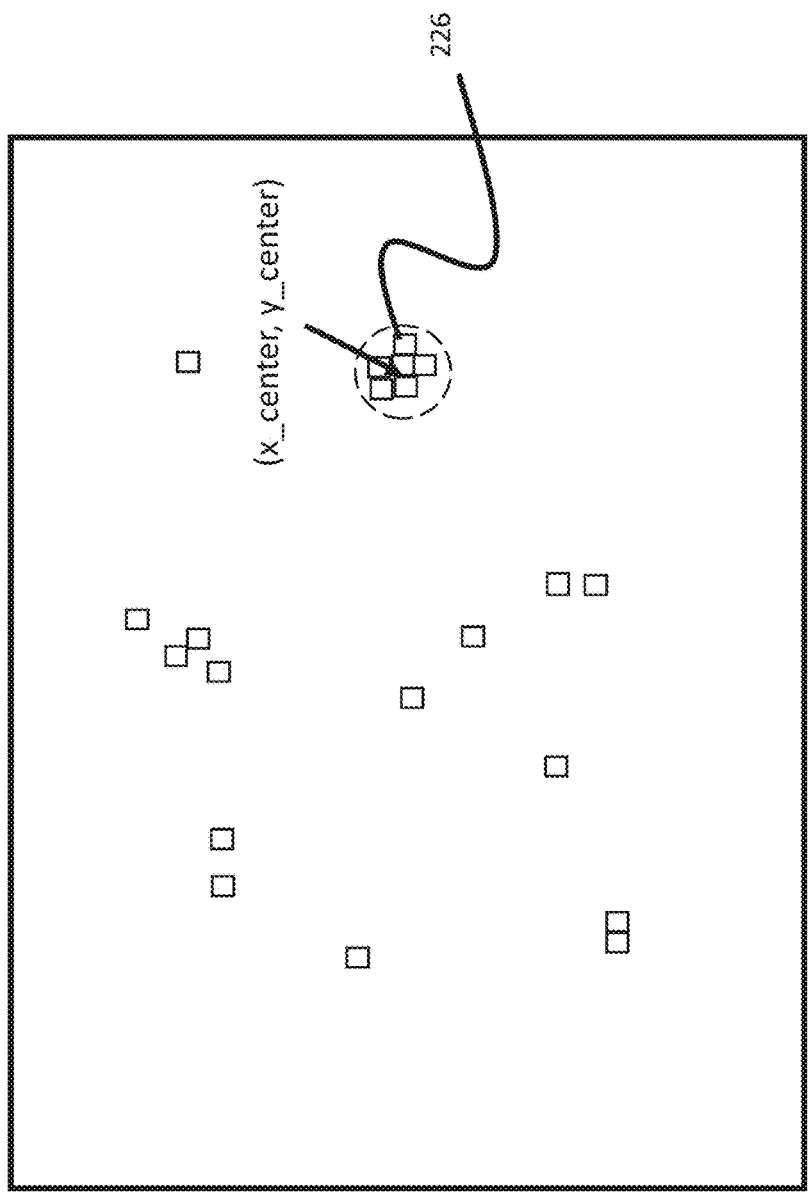
FIG. 19 is a diagram illustrating the largest cluster of pixels having a plurality of matches with target location skyline elevation angles according to an embodiment herein.

Referring to FIG. 19, the largest cluster of pixels 226 with each pixel having a plurality of matches with target location skyline elevation angles is illustrated. The contiguous cluster 226 with the largest number of pixels is chosen and the location is computed by computing the mean over all horizontal and vertical pixel positions in that cluster.

The angle increment for testing the absolute value of the difference between the corresponding target elevation angle and the corresponding area skyline information elevation angle, for example, may be on the order of the greater of the incremental change in the area skyline elevation angle for the current location that would result in about a one pixel shift for the projection of the corresponding area skyline point relative to the current location and the error in the measurement or calculation of the area skyline elevation angle and/or the target location elevation angle.

Some embodiments herein are directed to computer-implemented methods for determining at least an approximation of a target location within an area using at least in part corresponding target location skyline information comprising at least a plurality of azimuth angles $\varphi_i$ and a plurality of respective target location elevation angles and employing a shadow line algorithm. An embodiment herein includes the step of executing (190) a shadow line algorithm, applied to a digital elevation model (DEM) that at least includes a digital elevation model of the area, for each one of the plurality of azimuth angles $\varphi_i$ and a corresponding one of the plurality of target location elevation angles $\theta_i$, such that a plurality of shadow line images are created with each one of the plurality of shadow line images being created at least in part based on and corresponding to a corresponding one of a plurality of ordered pairs of azimuth angles and target location elevation angles ($\varphi_i,\theta_i$), there being one shadow line image among the plurality of shadow line images that is created for each one of the plurality of ordered pairs of azimuth angles and target location elevation angles ($\varphi_i,\theta_i$).

This embodiment further includes the step of summing (192) together the plurality of shadow line images to form a total shadow line image. Another step in this embodiment is finding (194) a largest cluster of locations, from among a plurality of locations within the area, each of which is in an area where shadow lines from at least two or more of the plurality of the shadow line images overlap. Yet another step in this embodiment is providing (196) the location of at least an approximate center of the largest cluster of locations, each of which is in an area where shadow lines from at least two or more of the plurality of the shadow line images overlap, as at least the approximation of the target location in the area corresponding to the plurality of ordered pairs of azimuth angles and target location elevation angles ($\varphi_i,\theta_i$).

In an embodiment herein, the step of executing (190) a shadow line algorithm includes the step of creating (198) a shadow image of the DEM using a respective one of the plurality of azimuth angles $\varphi_i$ and the corresponding one of the plurality of target location elevation angles $\theta_i$ to define the direction of illumination. The shadow image may be created using the process of creating a shadow image by creating a shadow volume map SV(x,y) as discussed above. A further step in this embodiment is applying (200) an edge detection method to the shadow image to delineate shadow edges in the shadow image resulting in a preliminary shadow line image. Another step in this embodiment is applying (202) a thresholding method to the preliminary shadow line image to sharpen the shadow edges resulting in an intermediate shadow line image. Yet another step in this embodiment is applying (204) an edge detection method to the DEM to sufficiently delineate discontinuities in the DEM resulting in an edge-delineated DEM.

This embodiment includes the further step of applying (206) a thresholding method to the edge-delineated DEM to create a mask that that is capable of sufficiently masking out grid locations where the DEM has discontinuities. Another step in this embodiment is multiplying (208) the intermediate shadow line image by the mask to mask out edges in the intermediate shadow line image that do not result from casting a shadow and thus obtain one of the plurality of shadow line images corresponding to the respective one of the plurality of azimuth angles $\varphi_i$ and the corresponding one of the plurality of target location elevation angles $\theta_i$. Multiplying the intermediate shadow line image by the mask comprises multiplying each pixel in the intermediate shadow line image by the corresponding pixel in the mask.

In some embodiments herein, the step of applying (200) an edge detection method to the shadow image comprises applying (210) a Sobel filter to the shadow image of the DEM to obtain the preliminary shadow line image, and the step of applying (204) an edge detection method to the DEM comprises applying (212) a Sobel filter to the DEM to obtain the edge-delineated DEM.

In an embodiment herein, the step of executing (190) a shadow line algorithm includes the step of creating (214) at least two shadow images using a shadow volume algorithm for a respective one of the plurality of azimuth angles $\varphi_i$ and its corresponding one of the plurality of target elevation angles $\theta_i$. Each of the at least two shadow images is formed using a corresponding set of altered illumination angles obtained by making one or more incremental alterations to one or more of the respective one of the plurality of azimuth angles $\varphi_i$ and the corresponding one of the plurality of target elevation angles $\theta_i$. Each shadow image has a number of shadow image elements, and each shadow image element contains a pixel value and corresponds to a pixel in the corresponding shadow image. Another step in this embodiment is summing (216) the corresponding at least two shadow images by summing together the pixel values in each of the at least two shadow images that correspond to the same grid location in the area over the at least two shadow images.

The step of summing the corresponding at least two shadow images results in a corresponding sum image for the respective one of the plurality of azimuth angles $\varphi_i$ and the corresponding one of the plurality of target elevation angles $\theta_i$. The sum image has a number of sum image elements, and each sum image element contains an integer pixel value in the range beginning with zero up to and including the number of the at least two shadow images. Also, each sum image element corresponds to a pixel in the sum image.

Another step in this embodiment is modifying (218) the sum image by setting each pixel value in the sum image to zero, if initially the pixel value in the sum image was a zero or equal to the number of the at least two shadow images, and by setting each pixel value in the sum image to one, if initially the pixel value in the sum image was greater than zero but less than the number of the at least two shadow images, to obtain a corresponding shadow line image for the respective one of the plurality of azimuth angles $\varphi_i$ and the corresponding one of the plurality of target elevation angles $\theta_i$. The shadow line image has a number of shadow line image elements, and each shadow line image element contains an integer pixel value that is either zero or one. Each shadow line image element corresponds to a pixel in the corresponding shadow line image, and each pixel in the shadow line image corresponds to a grid location in the area. A pixel value of one in a shadow line image element indicates that the grid location corresponding to the pixel is on or at about the edge or outline of a shadow cast by an elevated feature in the area for illumination angles defined by the respective one of the plurality of azimuth angles $\varphi_i$ and the corresponding one of the plurality of target elevation angles $\theta_i$.

The steps of creating the shadow images for the incrementally varied azimuth and elevation angles and summing the shadow images are intended to determine if the corresponding grid location is on a shadow line or edge cast by the skyline for the corresponding azimuth angle. Where the corresponding grid location is on a shadow line, varying the elevation and/or azimuth angles will cause the grid location to transition from shadow to light or vice versa. This transition will change the pixel value at the grid location from one to zero or the other way round.

Summing the shadow images for a given base azimuth and elevation angle allows the detection of whether or not a grid location is on a shadow line. If the grid location remains in shadow as the elevation and/or azimuth angles are varied, the pixel value for the grid location will be one in all the shadow images and the pixel value in the sum image will be the highest and equal to the total number of shadow images for each base azimuth angle. If the grid location remains in the light as the elevation and/or azimuth angles are varied, the pixel value for the grid location will be zero in all the shadow images and the pixel value in the sum image will be the lowest or zero for each base azimuth angle. Accordingly, those grid locations that have pixel values p in the sum image that are in the range 1≤p≤n−1 (which is the same as the range 0<p<n), where n is the total number of shadow images for each base azimuth angle, are on the shadow line cast by the skyline.

In some embodiments herein, the at least two shadow images include a first shadow image of the at least two shadow images that is formed using as illumination angles $\varphi_i$ and $\theta_i-\Delta\theta$, and a second shadow image of the at least two shadow images that is formed using as illumination angles $\varphi_i$ and $\theta_i+\Delta\theta$, wherein $\Delta\theta$ is an incremental change in the elevation angle.

In an embodiment herein, the step of executing a shadow line algorithm includes the step of creating (220) at least four shadow images using a shadow volume algorithm for a respective one of the plurality of azimuth angles $\varphi_i$ and its corresponding one of the plurality of target elevation angles $\theta_i$. Each of the at least four shadow images is formed using a corresponding set of altered illumination angles obtained by making one or more incremental alterations to one or more of the respective one of the plurality of azimuth angles $\varphi_i$ and the corresponding one of the plurality of target elevation angles $\theta_i$. Each shadow image has a number of shadow image elements, and each shadow image element contains a pixel value and corresponds to a pixel in the corresponding shadow image. Another step in this embodiment is summing (222) the corresponding at least four shadow images by summing together the pixel values in each of the at least four shadow images that correspond to the same grid location in the area over the at least four shadow images.

The step of summing the corresponding at least four shadow images results in a corresponding sum image for the respective one of the plurality of azimuth angles $\varphi_i$ and the corresponding one of the plurality of target elevation angles $\theta_i$. The sum image has a number of sum image elements, and each sum image element contains an integer pixel value in the range beginning with zero up to and including the number of the at least four shadow images. Each sum image element corresponds to a pixel in the sum image.

Another step in this embodiment is modifying (224) the sum image by setting each pixel value in the sum image to zero, if initially the pixel value in the sum image was a zero or equal to the number of the at least four shadow images, and by setting each pixel value in the sum image to one, if initially the pixel value in the sum image was greater than zero but less than the number of the at least four shadow images, to obtain a corresponding shadow line image for the respective one of the plurality of azimuth angles $\varphi_i$ and the corresponding one of the plurality of target elevation angles $\theta_i$. The shadow line image has a number of shadow line image elements, and each shadow line image element contains an integer pixel value that is either zero or one. Each shadow line image element corresponds to a pixel in the corresponding shadow line image, and each pixel in the shadow line image corresponds to a grid location in the area. A pixel value of one in a shadow line image element indicates that the grid location corresponding to the pixel is on or at about the edge or outline of a shadow cast by an elevated feature in the area for illumination angles defined by the respective one of the plurality of azimuth angles $\varphi_i$ and the corresponding one of the plurality of target elevation angles $\theta_i$.

In some embodiments herein, a first shadow image of the at least four shadow images is formed using as illumination angles $\varphi_i-\Delta\varphi$ and $\theta_i-\Delta\theta$, a second shadow image of the at least four shadow images is formed using as illumination angles $\varphi_i-\Delta\varphi$ and $\theta_i+\Delta\theta$, a third shadow image of the at least four shadow images is formed using as illumination angles $\varphi_i+\Delta\varphi$ and $\theta_i-\Delta\theta$, and a fourth shadow image of the at least four shadow images is formed using as illumination angles $\varphi_i+\Delta\varphi$ and $\theta_i+\Delta\theta$, where $\Delta\varphi$ is an incremental change in the azimuth angle and $\Delta\theta$ is an incremental change in the elevation angle. For all embodiments herein that employ incremental angle changes, the incremental angle changes $\Delta\varphi$ and $\Delta\theta$ should be as small as needed to produce results of practically useful accuracy while being large enough so that they produce detectable changes in the shadow line in view of the available resolution of the DEM. The remarks made in reference to the embodiments that employ at least two shadow images for each of the plurality of azimuth angles are equally applicable to the embodiments employing at least four shadow images.

Any sound edge detection method may be used with the embodiments herein. The Sobel filter is one example of such an edge detection method. The Sobel filter is well known and will not be discussed in detail herein. The Sobel filter, also known the Sobel operator, includes two 3×3 matrices, one for the x direction and one for the y direction, that are multiplied, for each pixel in source image, with a 3×3 matrix of pixels from a source image centered at each pixel of the source image that result in two images; one with its x-directed edges enhanced and one with its y-directed edges enhanced. The two images are then added to produce an edge-detected or edge-enhanced version of the source image. Each Sobel matrix has a middle row or column of zeros, and values on either side of the middle row or column of zeros are of equal magnitude but have opposite signs. If a pixel is near an edge, the pixel values on either side of the center pixel will be different and their contribution to the matrix product will not cancel out and the value of the center pixel can be enhanced in absolute value. If, on the other hand a pixel is not near an edge, the pixel values on either side of the center pixel will be the same and their contribution to the matrix product will cancel out and the value of the center pixel will be suppressed.

Any sound thresholding method may be used with the embodiments herein. Thresholding methods are well known and will not be discussed in detail herein. A simple thresholding method is the application of an inequality operation to a source image. With this method, if the less than threshold value operation is used, pixel values below the threshold are set to one and pixel values above the threshold are set to zero. If the greater than threshold value operation is used, pixel values below the threshold are set to zero and pixel values above the threshold are set to one. An example of a threshold value that has been applied in the embodiments herein is 0.1.

Any sound technique for identifying clusters may be used with the embodiments herein. Image processing techniques for identifying clusters of like pixels that can be used with the embodiments herein are well known and will not be discussed in detail herein. One example of such a technique is known as connected-component labeling, and the "two-pass algorithm" is a simple form of connected-component labeling. Briefly, on a first pass or raster scan, touching pixels of the same value are given the same label, if they are not labeled already; otherwise, the unlabeled pixel receives a new label and the equivalence of their labels is recorded. A new label is given a touching pixel that has a different value. On the second pass the smallest member of the class of equivalent labels is assigned to all the pixels having labels in the same class of equivalent labels.

The embodiments disclosed herein include computer systems comprising one or more computing devices 166, 178, each of the one or more computing devices comprising one or more processors 180; one or more non-transitory, computer-readable media 182, 188; one or more input devices 184; and one or more output devices 186; the computer systems being programmed to perform any one or more of the methods in accordance with any of the embodiments herein or any part thereof. In some embodiments herein, the one or more computing devices may be programmed to execute, cooperatively or individually, any one or more of the methods in accordance with any of the embodiments herein or any part thereof.

The one or more processors, the one or more non-transitory, computer-readable media, the one or more input devices, and the one or more output devices may be parts of one or more computing devices 166, 178, such that storage and execution of program instructions may be carried out in distributed fashion. The one or more computing devices may be of various types including, without limitation, servers, desktops, and mobile devices such as laptops, tablets, cellphones, smartphones and any combination of these. The computing devices may be linked by, without limitation, LAN, WAN, enterprise networks, wired and wireless networks, satellite communications, cellular communication networks, Wi-Fi, via the internet or cloud, or any combination of these. One or more of the computing devices may be part of the internet or the cloud.

The term "computer system" is used broadly herein to refer to any system that employs processors capable of executing program instructions. Accordingly, "computer system" as used herein may include specialized equipment such as autonomous or self-driving vehicles and cameras, which may in some embodiments be mounted on an autonomous vehicle. As used herein, "computer system" may also refer to specialized equipment having one or more processors embedded therein, which are capable of executing program instructions. In some embodiments, a camera may be among the input devices of the computer system. Accordingly, in some embodiments, the observer may be part of the computer system.

As used herein, the input device may, without limitation, be a touch screen, a camera, a keyboard, a USB or other communication port, a modem, a router, a wired or wireless network interface, a Wi-Fi interface, a cellular network interface, a satellite communication interface, a flash drive, a magnetic disc drive, solid state disc, or an optical disc drive. As used herein, the output device may, without limitation, be a touch screen, a display, a USB or other communication port, a modem, a router, a wired or wireless network interface, a Wi-Fi interface, a cellular network interface, a satellite communication interface, a flash drive, a magnetic disc drive, solid state disc, or an optical disc drive. As used herein, the non-transitory, computer-readable medium or media may, without limitation, be any memory device, any type of RAM, including SRAM, or ROM, cache memory, or any type of mass storage device including a hard disc, a flash drive, a magnetic disc drive, solid state disc, an optical disc drive, magnetic core or bubble memory, regardless of being removable or not, or any webstore, website, or cloud-based service that allows for downloading, uploading, storage, and/or retrieval of data, program instructions, software, and/or firmware. As used herein, processor may, without limitation, be a CPU, a graphics processor (GPU), math coprocessor, processors for smartphones, multiple processors in a single computing device, multiple processors distributed over a network, or any combination of these.

The embodiments herein include a non-transitory, computer-readable medium 182, 188 that at least has program instructions thereon that when executed by a computer system cause the computer system to perform any one or more of the methods in accordance with any of the embodiments herein or any part thereof.

When the observer is a person, displaying the computed observer coordinates on the display of a mobile device may suffice to make the computed coordinates available to the controlling authority. When the observer is, for example, an autonomous vehicle, the computed observer coordinates may have to be transmitted by electronic signals to the control system of the autonomous vehicle via some type of network or communications interface in order to make the computed coordinates available to the controlling authority.

The remarks made herein in reference to the method embodiments herein are equally applicable to the computer system embodiments herein and the non-transitory, computer-readable medium embodiments herein.

One advantage of the embodiments herein, particularly those embodiments that employ shadow line images, is that they require significantly less computing power compared to other approaches employed previously, such that the embodiments herein allow mobile devices such as laptops, tablets, cellphones, and smartphones that have a DEM of the local area stored therein to provide positioning or localization information in real time even if communication with other computing devices in the system is lost due to jamming or other interference or due to the other computing devices in the system going down. Accordingly, the embodiments herein provide a technological solution to the technological problem of allowing a mobile computing device to provide positioning or localization information in real time while operating as a stand-alone device.

Figure 20:
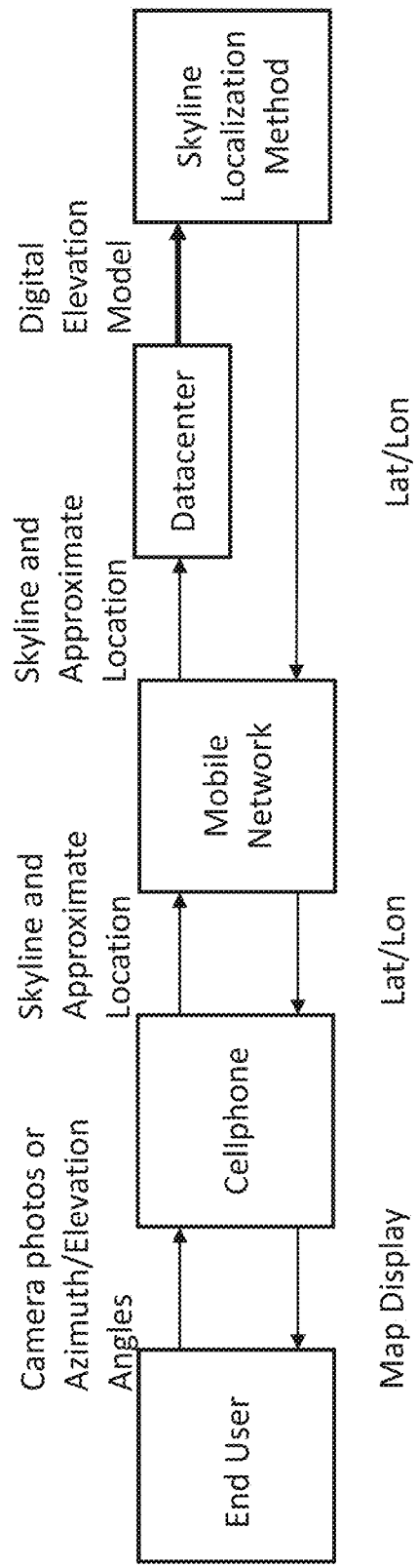
FIGS. 20 through 22 are schematic diagrams illustrating various arrangements for implementing some of the embodiments herein involving interaction between computer systems of different parties.
Figure 21:
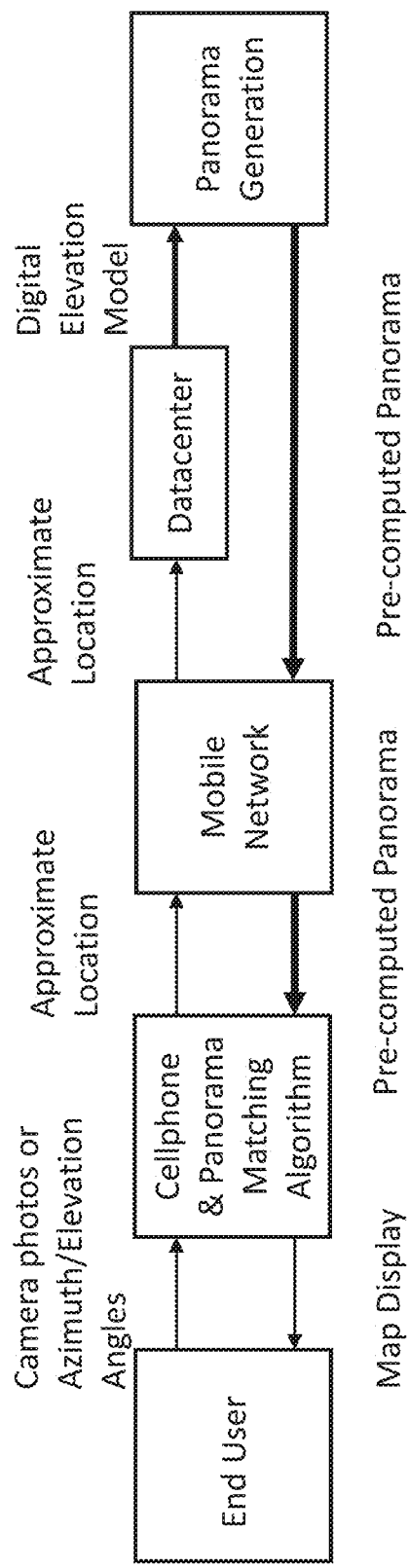
Figure 22:
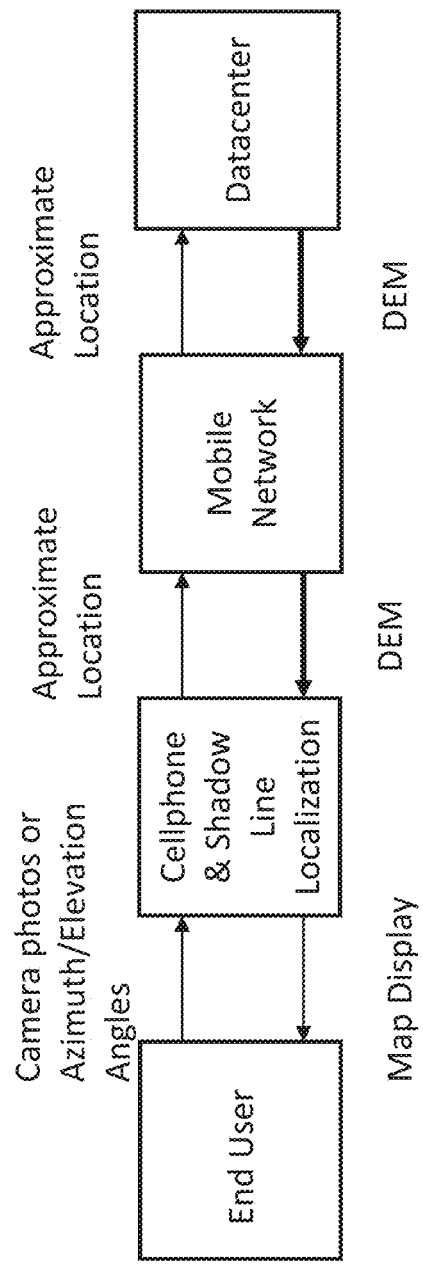

Referring to FIGS. 20 through 22, various arrangements for implementing some of the embodiments herein involving interaction between computer systems of different parties are illustrated. FIG. 20 illustrates cloud-based localization. The user only transmits azimuth and elevation angles to a datacenter, also referred to herein as a remote server 228, which then finds the best match between measured and computed skylines and sends back only the latitude and longitude to the user via the cellphone 166. The advantages of this version are (1) that very little data needs to be communicated wirelessly, (2) the computation is done in the cloud and (3) either the pre-computed panorama method followed by the panorama matching method can be run or the more accurate shadow line based method. The disadvantage is that a reliable communication is needed for each localization which would be difficult for areas with limited cellphone coverage and impossible without coverage.

FIG. 21 illustrates cloud-based panorama pre-computation with a local skyline matching method. The user only transmits azimuth and elevation angles to a datacenter 228 which then computes the panorama for a DEM, also referred to herein as the area skyline data or information, and sends that back to the user. The advantages of this version are (1) that very little data needs to be communicated wirelessly up-stream, (2) the computation of the panorama is done centrally freeing up the cellphone device from this costly operation and just needing to do the skyline matching locally on the cellphone 166, which is a much less costly operation, (3) being able to perform localizations for as long as the user stays in the area were the pre-computed panorama is available even if cellphone reception is not available or has ceased to be available, and (4) can potentially run very fast thus enabling real-time localization for augmented reality. The disadvantages are (1) that the large amount of data sent from the datacenter may stress the mobile network and (2) the localization may not be as accurate as the shadow line based method.

FIG. 22 illustrates an arrangement where the cellphone or smartphone 166 performs the shadow line based localization using a local DEM. The user only transmits azimuth and elevation angles to a datacenter 228, this only needs to be a coarse approximation of the location of the area to allow selection of the correct DEM, which then sends back a DEM of the area of interest back to the user. The advantages of this version are (1) that very little data needs to be communicated wirelessly up-stream, (2) the shadow line localization using the dual source shadow line method or the quadruple source shadow line method can be done locally freeing up the cloud to serve other customers, (3) being able to perform localizations locally even when the user is in the area or in areas where cellphone reception is not available or has ceased to be available, (4) is more accurate than matching a discretized pre-computed panorama, and (5) can run potentially in real-time which would be suited to augmented reality applications. The disadvantages are that (1) a powerful cellphone processor with a large amount of memory is needed to perform the shadow line computation and (2) that the large amount of data sent from the datacenter may stress the mobile network.

Figure 23:
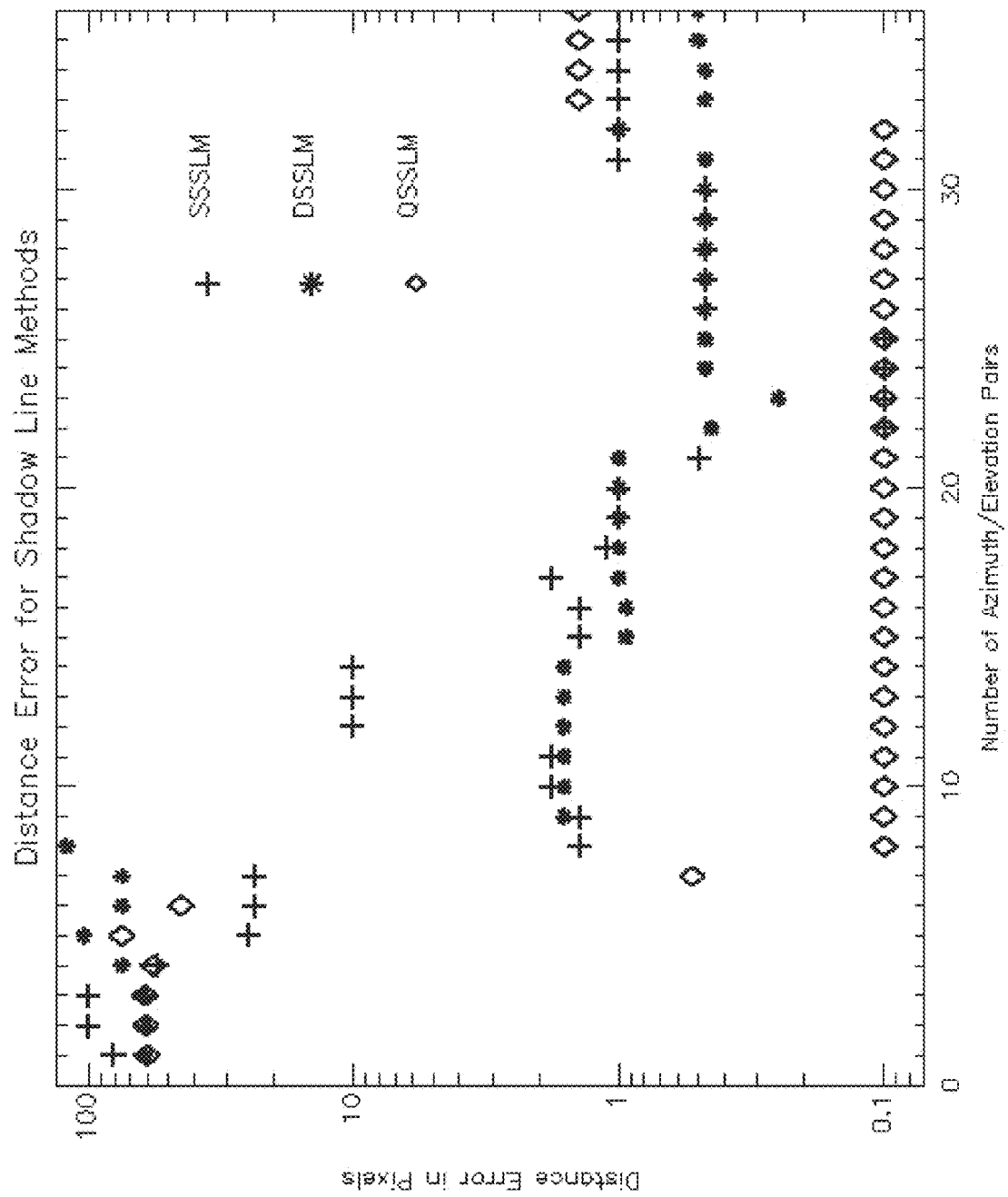
FIGS. 23 through 25 are graphs illustrating experimental results using some of the embodiments herein.
Figure 24:
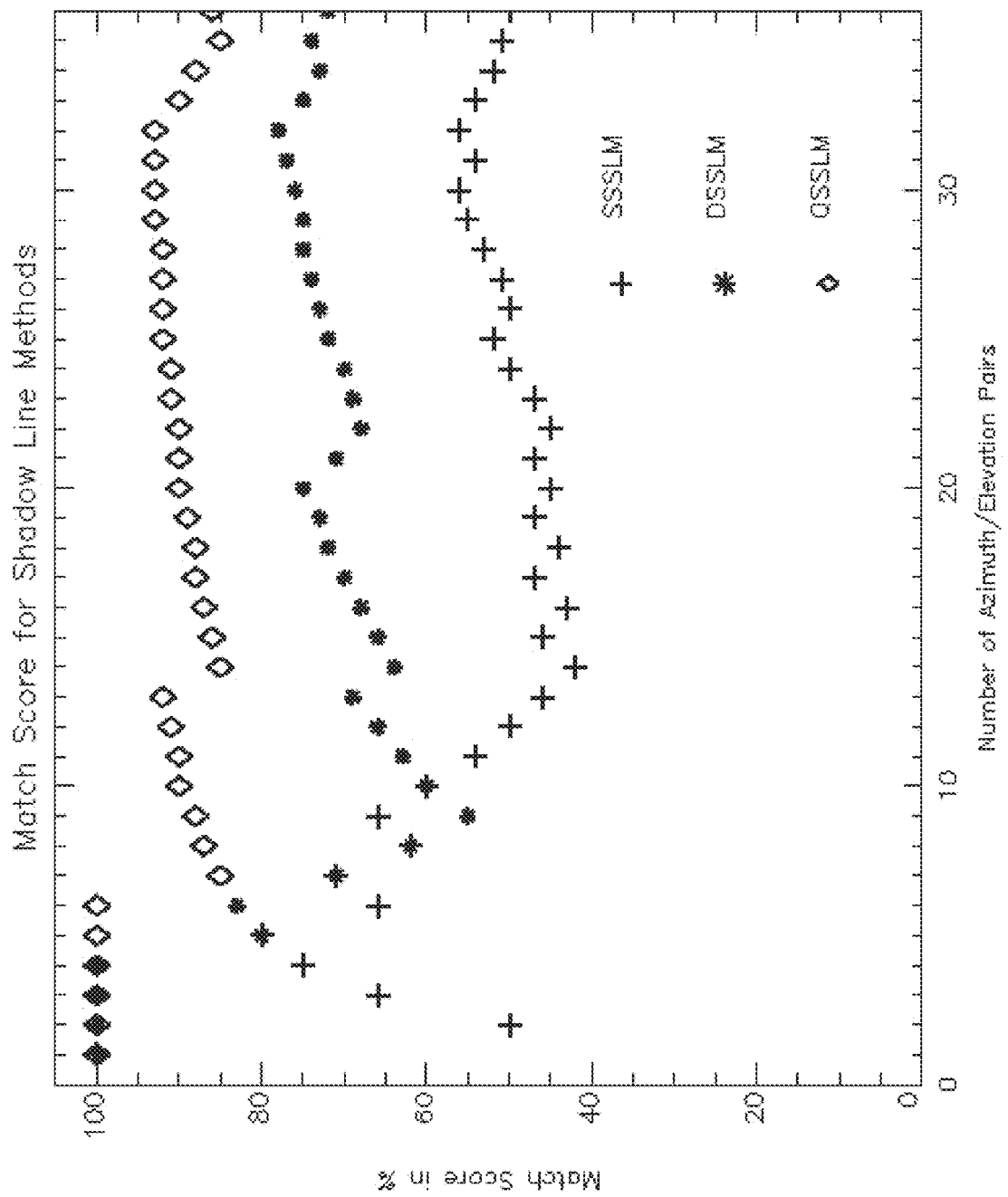
Figure 25:
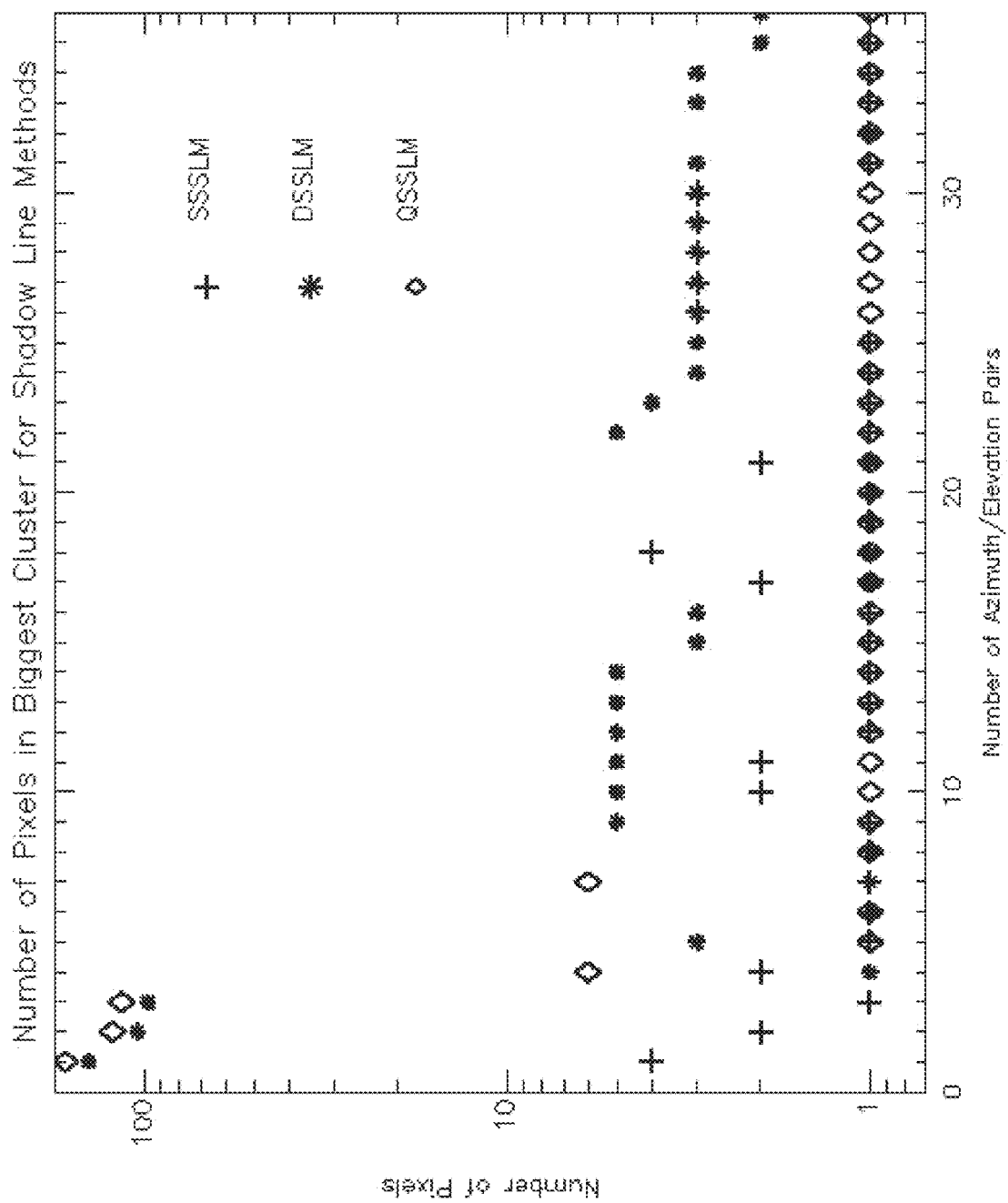

Referring to FIGS. 23 through 25, graphs illustrating experimental results using some of the embodiments herein can be seen. Referring to FIG. 23, the distance error $d(i)=\text{sqrt}((x\_best(i)-x\_true)^2+(y\_best(i)-y\_true)^2)$ for $i=1, \ldots, 36$ for the three methods shows the quadruple source shadow line method (QSSLM) achieving d=0.0 m using only 8 pairs, single source shadow line method (SSSLM) with 20 pairs and the dual source shadow line method (DSSLM) achieves errors below 1 m at 22 pairs.

Referring to FIG. 24, a useful measure to compare the three shadow line methods is to compute the match score which is given as the percentage of points falling to within $\pm\Delta\theta/2$ of the computed skyline. The SSSLM has the lowest match score ranging from 40-65% since its shadow line is derived using image processing methods which are susceptible to aliasing. This problem occurs less for the DSSLM which lies between 60 and 80% and the QSSLM maintains a match score of over 80%.

Referring to FIG. 25, a useful measure of the uniqueness of the shadow line methods are how many pixels make up the largest cluster for each method. Single pixels are found using the SSSLM after 3, DSSLM after 4 and QSSLM after 5 pairs of skyline azimuth and elevation angles. SSSLM and DSSLM clusters range from 1 to 5 pixels in size.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A computer-implemented method for use in determining at least an approximation of a target location within an area using at least in part corresponding target location skyline information comprising at least a plurality of azimuth angles $\varphi\_i$ and a plurality of respective target location elevation angles $\theta\_i$ and using area skyline information for the area, the method comprising:

initializing a skyline match count array (SL_match(x,y)) by setting each element of SL_match(x,y) equal to zero, wherein each (x,y) corresponds to one of a plurality of grid locations in the area identified by corresponding coordinates x and y and wherein the area skyline information comprises a plurality of area skyline information elevation angles each corresponding to a corresponding one of the plurality of azimuth angles $\varphi\_i$ for one or more grid locations (x,y);

performing, for each of the plurality of azimuth angles $\varphi\_i$ and for each of the plurality of grid locations (x,y), a matching process comprising:

comparing the corresponding target elevation angles from the target location skyline information (SL($\varphi\_i$)) with the corresponding area skyline information elevation angle from the area skyline information by testing the absolute value of the difference between the corresponding target elevation angle and the corresponding area skyline information elevation angle to determine if the absolute value of the difference between the corresponding target elevation angle and the corresponding area skyline information elevation angle is less than or equal to an angle increment ($\Delta\theta$); and incrementing the corresponding element of SL_match (x, y) by one if the absolute value of the difference between the corresponding target elevation angle and the corresponding area skyline information elevation angle is less than or equal to the angle increment; and outputting the x,y locations and match values that correspond to the most likely approximate target locations.

2. The method of claim 1, further comprising: finding a maximum value of all the elements of SL_match(x,y) and outputting those x,y locations and maximum value.

3. The method of claim 2, further comprising: determining corresponding x,y, delta azimuth, and delta elevation values for said maximum value of all the elements of SL_match(x,y).

4. The method of claim 3, further comprising: creating a binary array with each element corresponding to a grid location (x,y) by testing each of the elements of SL_match (x,y) to determine if it is equal to the maximum value, and setting the corresponding element of the binary array equal to zero if the corresponding element of SL_match(x,y) is not equal to the maximum value and equal to one if the corresponding element of SL_match(x,y) is equal to the maximum value.

5. The method of claim 4, further comprising: finding the largest cluster of grid locations that have a value of one for their corresponding element in the binary array.

6. The method of claim 5, further comprising: finding the average x coordinate and the average y coordinate for the largest cluster of grid locations.

7. The method of claim 5, further comprising: providing the average x coordinate and the average y coordinate for the largest cluster of grid locations as at least the approximation of the target location in the area corresponding to the target location skyline information.

8. The method of claim 1, further comprising: determining at least an approximation of a target location within an area using at least in part corresponding target location skyline information comprising at least a plurality of azimuth angles $\varphi i$ and a plurality of respective target location elevation angles and employing a shadow line algorithm.

9. The method of claim 8, further comprising: executing the shadow line algorithm, applied to a digital elevation model (DEM) that at least includes a digital elevation model of the area, for each one of the plurality of azimuth angles $\varphi i$ and a corresponding one of the plurality of target location elevation angles $\theta i$, such that a plurality of shadow line images are created with each one of the plurality of shadow line images being created at least in part based on and corresponding to a corresponding one of a plurality of ordered pairs of azimuth angles and target location elevation angles ($\varphi i$, $\theta i$), there being one shadow line image among the plurality of shadow line images that is created for each one of the plurality of ordered pairs of azimuth angles and target location elevation angles ($\varphi i$, $\theta i$).

10. The method of claim 1, wherein the angle increment for testing the absolute value of the difference between the corresponding target elevation angle and the corresponding area skyline information elevation angle is on the order of the greater of the incremental change in the area skyline elevation angle for the current location that would result in about a one pixel shift for the projection of the corresponding area skyline point relative to the current location and the error in the measurement or calculation of the area skyline elevation angle and/or the target location elevation angle.

11. A computer system comprising one or more computing devices, each of the one or more computing devices comprising one or more processors; one or more non-transitory, computer-readable media; one or more input devices; and one or more output devices, the computer system being programmed to perform the method of claim 1.

12. The computer system of claim 11, wherein the one or more processors comprise: a central processing unit (CPU), a graphics processor (GPU), a math coprocessor, one or more processors for a smartphone, multiple processors in a single computing device, multiple processors distributed over a network, or any combination of these.

13. A non-transitory, computer-readable medium at least having program instructions thereon that when executed by a computer system cause the computer system to perform the method of claim 1.

* * * * *